United States Patent [19]
Mishra et al.

[11] Patent Number: 5,590,126
[45] Date of Patent: Dec. 31, 1996

[54] METHOD FOR CALL ESTABLISHMENT AND REROUTING IN MOBILE COMPUTING NETWORKS

[75] Inventors: Partho P. Mishra, Murray Hill; Mani B. Srivastava, Chatham, both of N.J.

[73] Assignee: Lucent Technologies Inc., Murray Hill, N.J.

[21] Appl. No.: 534,760

[22] Filed: Sep. 27, 1995

[51] Int. Cl.$^6$ ............................... H04L 12/56; H04B 7/26
[52] U.S. Cl. ............................ 370/329; 370/397; 379/60
[58] Field of Search ............................... 370/54, 60, 60.1, 370/94.2, 17, 95.1, 95.3, 68, 110.1; 379/59, 60, 63; 455/33.1, 33.2, 33.3, 33.4, 54.1, 54.2, 56.1

[56] References Cited

U.S. PATENT DOCUMENTS

| | | | |
|---|---|---|---|
| 5,371,738 | 12/1994 | Moelard et al. | 379/60 |
| 5,384,826 | 1/1995 | Amitay | 379/60 |
| 5,386,456 | 1/1995 | Schatz et al. | 379/60 |
| 5,400,338 | 3/1995 | Flammer, III | 379/60 |
| 5,418,838 | 5/1995 | Havermans et al. | 379/60 |
| 5,471,644 | 11/1995 | Schatz et al. | 455/33.2 |
| 5,487,065 | 1/1996 | Acampora et al. | 370/60.1 |

OTHER PUBLICATIONS

P. Agrawal, et al., "A Testbed For Mobile Network Computing," published in Proc. IEEE Intl. Conference on Communications, ICC 1995.

*Primary Examiner*—Douglas W. Olms
*Assistant Examiner*—Chau T. Nguyen

[57] ABSTRACT

A method for supporting end to end VC oriented service between mobile hosts. Included are protocols designed for a micro-cellular wireless environment in which mobile hosts make frequent transitions between cells. A VC rerouting procedure minimizes the effect of frequent hand-offs by extending routes and triggering a route rebuild only when performance as seen by an application degrades below a certain level. VC establishment and rerouting protocols assume the existence of separate signaling protocols for the wired and the wireless network, respectively. This minimizes the changes required to the signaling infrastructure used in the wired network while allowing the signaling in the wireless network to be customized for the unique requirements of that particular environment.

24 Claims, 16 Drawing Sheets

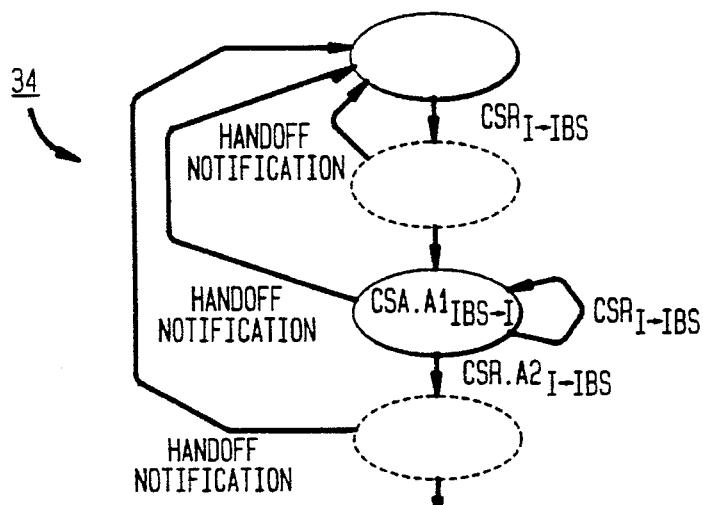
FIG. 5A
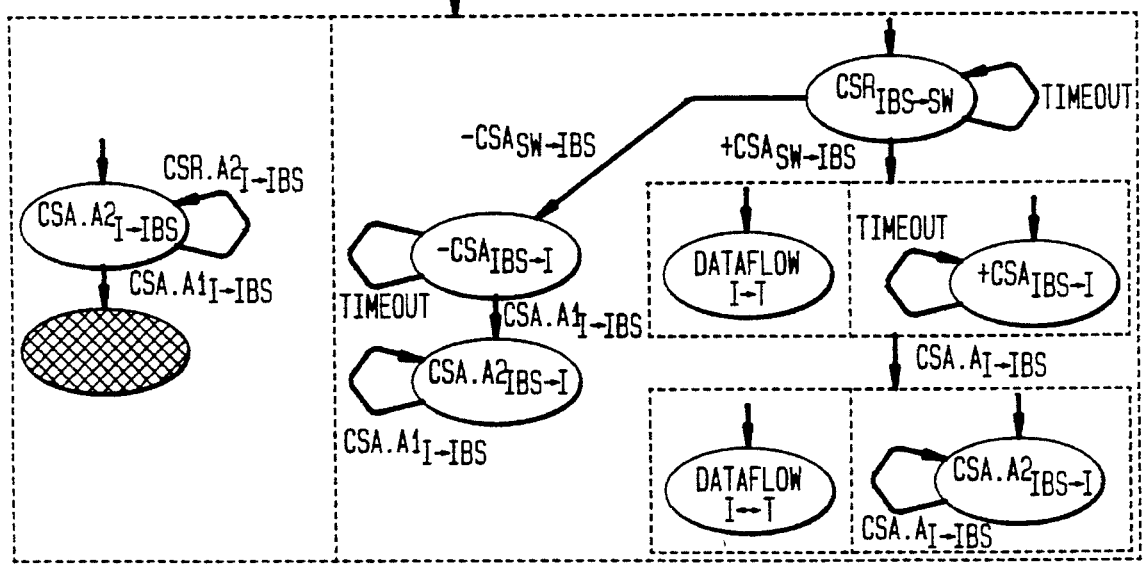
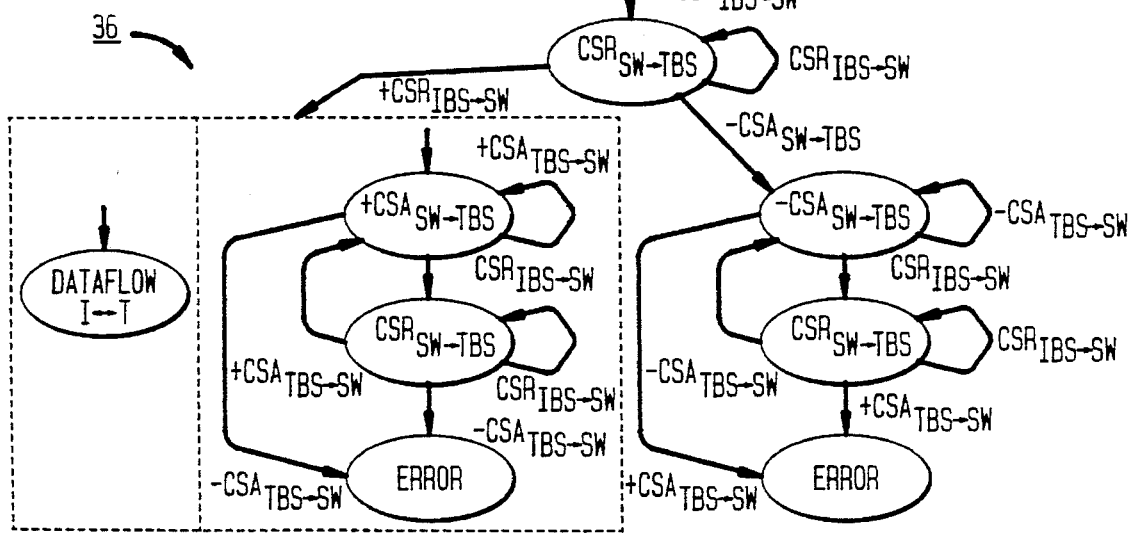
FIG. 5B

MOBILE HOST MOVES FROM BS[-1] TO BS[0] WHICH IS THE SAME AS BS[-(n+1)] SO THAT EXTENSION WILL RESULT IN A LOOP

1. MH REGISTERS WITH BS[0] AND PROVIDES BS[0] WITH {VCI_4, VCI_4'}
2. BS[0] RESERVES {VCI_3, VCI_3'} AND TELLS MH
3. BS[0] SENDS {VCI_4, VCI_4'} TO BS[-1]
4. USING TABLE LOOK-UP BS[-1] MAPS {VCI_4, VCI_4'} TO {VCI_5, VCI_5'} AND SENDS TO BS[-2]
5. EVENTUALLY BS[0]==BS[-(n+1)] KNOWS {VCI_2, VCI_2'} AND THUS {VCI_1, VCI_1'}

1. BS[0] BEGINS TO BUFFER CELLS COMING ON VCI_1 AND SENDS A MARKER CELL M1 ON VCI_2
2. BS[-1] SENDS A MARKER CELL M2 ON VCI_5' AND THEN FORWARDS CELLS ON VCI_5 TO VCI_5'
3. BS[0] WAITS FOR MARKER CELL M2 ON VCI_2'

1. ON RECEIVING M2 ON VCI_2', BS[0] CONNECTS VCI_3' TO VCI_1', AND VCI_2' TO VCI_3
2. BS[0] WAITS FOR MARKER CELL M1 ON VCI_2'

METHOD FOR CALL ESTABLISHMENT AND REROUTING IN MOBILE COMPUTING NETWORKS

FIELD OF THE INVENTION

The present invention relates generally to the field of telecommunications systems, and more particularly to a method and apparatus for call establishment and rerouting in wireless mobile computing networks.

BACKGROUND OF THE INVENTION

The general area of wireless networks and mobile computing has seen an explosion in interest over the past few years. Two of the dominant architectural models for supporting wireless access to communication networks are cellular telephone networks and mobile-IP networks.

In cellular networks, the "problem" of mobility is handled by having all the routing decisions made at special purpose mobile telephone switching offices (MTSO). All traffic routed to a mobile will always pass through this MTSO, irrespective of the mobile's movement patterns. This approach makes inefficient use of network bandwidth and is unlikely to be useful for supporting more general applications.

Several techniques have also been proposed to allow mobility to be handled in IP networks. Initial proposals in the prior art supported mobility by having a "home" gateway forward packets to a mobile as it moved through the network. Recent proposals attempt to improve the efficiency of the routing process by disseminating the information about the mobile's location to network switches so that they can directly route packets it. However, the use of datagram routing in which different packets may take different paths through the network in combination with relatively slow route update intervals make this an unattractive option for audio and video traffic that require bounded delay.

Although, the cellular and mobile-IP networks have attempted to address the requirements of a large (but disjoint) class of users, the increasing desire for access to multimedia information on the part of these users will likely cause both network types to be supplanted by an emerging generation of cell-switching networks, such as ATM, which provide support for voice, video, data and image traffic. These networks are based on a virtual circuit (VC) oriented packet switching paradigm which makes it possible to associate and guarantee service quality requirements for a wide variety of multimedia applications. Accordingly, there is a need to address mobility management in the context of such a packet switching paradigm.

SUMMARY OF THE INVENTION

The present invention discloses a method for supporting end to end VC oriented service between mobile hosts. Included in the invention are protocols designed for a micro-cellular wireless environment in which mobile hosts make frequent transitions between cells. A VC rerouting procedure minimizes the effect of frequent hand-offs by extending routes and triggering a route rebuild only when performance as seen by an application degrades below a certain level. VC establishment and rerouting protocols assume the existence of separate signaling protocols for the wired and the wireless network, respectively. This minimizes the changes required to the signaling infrastructure used in the wired network while allowing the signaling in the wireless network to be customized for the unique requirements of that particular environment.

One preferred embodiment of the present invention includes a method for call rerouting in a mobile computing network.

BRIEF DESCRIPTION OF THE FIGURES

For a better understanding of the present invention, reference may be had to the following description of exemplary embodiments thereof, considered in conjunction with the accompanying drawings, in which:

FIGS. 5A and 5B show exemplary state machine diagrams for VC establishment at the initiator base station and a switch, respectively;

DETAILED DESCRIPTION

Figure 1:
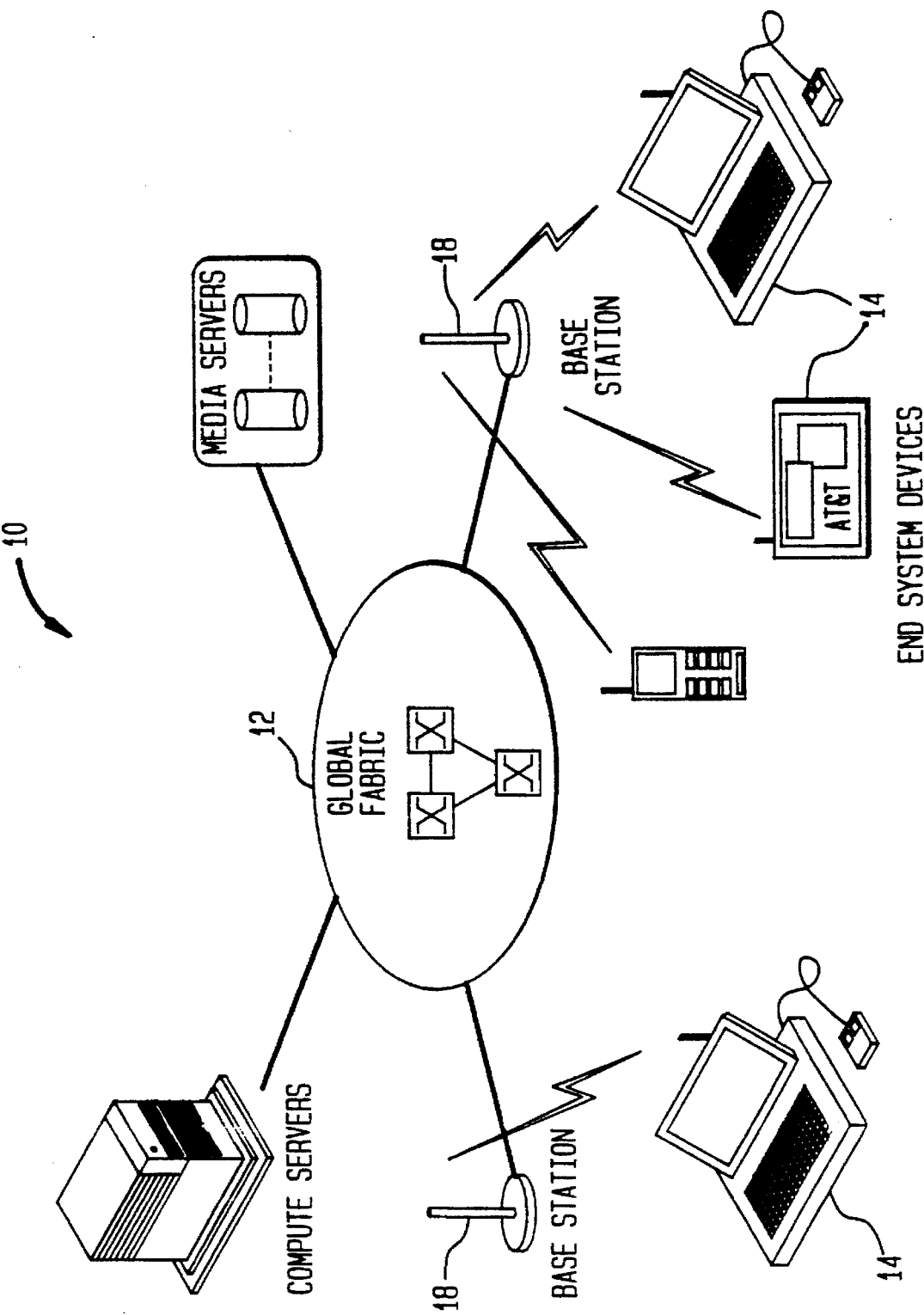
FIG. 1 shows a networked computing environment used in conjunction with the present invention.

The present invention is a method for call establishment and rerouting in mobile computing networks which provides the ability to establish, reroute and teardown virtual circuits (VCs) to and from mobile hosts and provide service quality guarantees for these VCs in the presence of mobility. Referring to FIG. 1 there is shown one preferred embodiment of a networked computing environment 10 with which the present invention is utilized. The networked computing environment 10 includes a wired backbone network 12 with wireless last hops to mobile hosts 14, wherein the mobile hosts include, for example, multimedia computing stations as well as separate voice and video devices. The wired network 12 may include, for example, a hierarchy of Local Area Networks, Metropolitan Area Networks and Wide Area Networks using a VC oriented switching paradigm and providing per-connection QOS guarantees. In a preferred embodiment of the environment 10, the Local Area and Wide Area ATM networks run the same signaling protocol, e.g., Q.2931.

The wireless network is preferably micro-cellular radio-based, with cell sizes of less than 20/30 square feet. Special switches called base stations 18 provide a gateway for communication between the wired network 12 and the mobile hosts 14 in a cell. A mobile host 14 is assumed to send and receive all its communications traffic through the base station in its current cell. A mobile can have all the capabilities of a non-wireless network host and is therefore able to participate in complex signaling and data transfer protocols. For a more detailed description of the above-described network environment, see "A Testbed for Mobile Networked Computing", Agrawal et al., Proc. IEEE Intl. Conference on Communications. ICC 1995. Seattle, Wash. Jun. 18–22, 1995, that document being incorporated herein by reference.

The network environment 10 presented in FIG. 1 provides several design challenges with respect to mobility management. First, due to the small cell sizes, e.g. 20/30 square feet, it is likely that there will be frequent hand-offs between cells—consider, for example, a mobile user strolling down a corridor. This makes it necessary to support frequent hand-off events with the possibility that several hand-offs may occur before all the signaling required to handle a previous hand-off has completed. Second, the cellular structure provides increased bandwidth thereby making it more likely that there will be multiple VCs terminating in a mobile. Hence, the protocols used in the wireless network have to be able to reroute multiple VCs following a single hand-off event. Third, advances in image compression algorithms allow the transmission of packetized video over the wireless links, necessitating the support for this class of traffic.

In order to provide end-to-end VC oriented connectivity in this environment, requires the ability to establish, reroute and teardown VCs to and from mobile hosts as they move between cells. Assuming that it always possible to locate the current cell of a mobile, for example, by tracking or paging, the problem is reduced to that of supporting data transfer to/from a mobile as it moves. Moreover, any solution has to work correctly in the presence of mobility during the signaling phase itself. As would be understood, performance goals are to minimize the impact of mobility on application level performance while making efficient use of network capacity.

The present invention VC establishment procedure handles mobility, in the common case, by allowing completion of connection establishment and then triggering a reroute when necessary. However, the connection setup is aborted if the connection setup request has not been forwarded by the local base station before a hand-off. The VC rerouting procedure handles mobility by extending routes and triggering a route rebuild only when performance as seen by an application degrades below a certain level. This is meant to minimize disruption on the performance seen by applications due to frequent hand-offs, while also exploiting the dichotomy between the costs of local and global paths. A simple optimization that may be used to improve network efficiency during the extension process is to detect and eliminate loops in the network path. The protocol for VC teardown is very, similar to the that used for VC establishment.

The VC establishment and rerouting protocols for the present invention assume the existence of a signaling infrastructure based on the use of separate signaling protocols for the wired and the wireless network, respectively, with base stations acting as gateways between the two logically distinct networks. With this approach, changes required to the signaling infrastructure used in the wired network are minimized while allowing the signaling in the wireless network to be customized for the unique requirements of that particular environment. The signaling protocol in the wired network is used to establish, teardown and rebuild connections. The signaling protocol in the wireless network is used to extend routes, remove route loops and trigger route rebuilds, in addition to the establishment, teardown and rebuilding of connections. The protocols used in the wireless network are designed to handle multiple hand-off events, both during data transfer and signaling.

The protocols of the present invention are described assuming that datagram based delivery, is available for the exchange of signaling messages between mobile hosts and base stations. These signaling messages use reserved VC identifiers. While, this approach requires switches to be able to perform both datagram and VC based routing, it leads to more natural and elegant solutions due to the suitability of datagram routing for message oriented traffic. The use of VCs to transport signaling messages necessitates the rerouting of these signaling VCs prior to the rerouting of data transfer VCs following a hand-off event.

As will be understood, the protocols of the present invention are designed to handle multiple hand-offs both during VC establishment and rerouting. Route extensions are used following a hand-off delaying expensive route rebuilds until they are absolutely necessary. Algorithms are described for the detection and removal of loops caused by the use of the route extension mechanism. A rational basis is also proposed for choosing the switch from which a VC rebuild is initiated.

Figure 2:
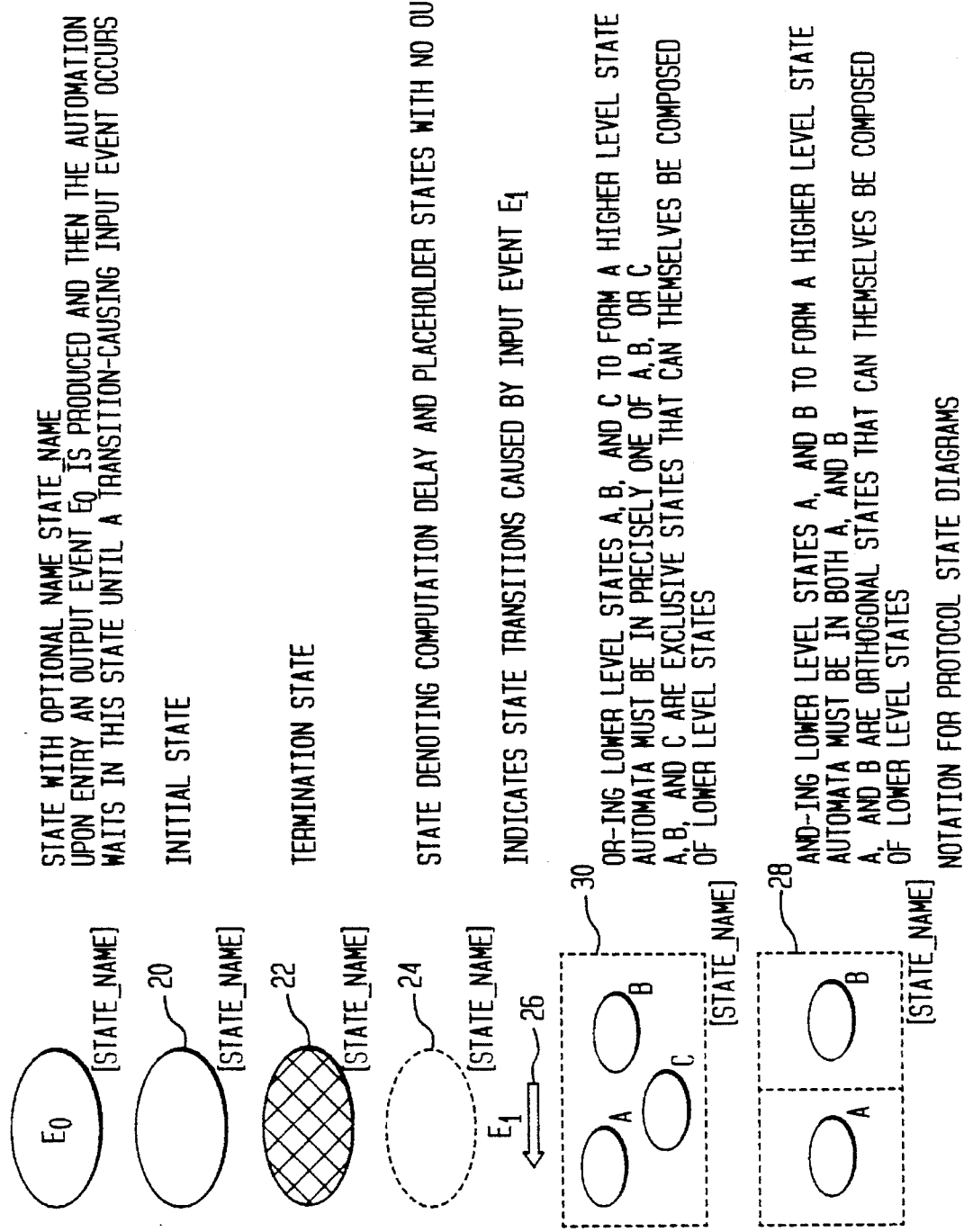
FIG. 2 shows an exemplary notation for the protocol state diagrams of the present invention.

The protocols of the present invention are described herein utilizing timeline diagrams and state machine diagrams. The timeline diagrams show inter-entity interaction, for example, between mobiles, base stations, etc. A hierarchical state machine is used for illustration with each entity. The hierarchical state machine model allows lower level states to be composed into higher level super states. Referring to FIG. 2, there is shown an exemplary notation scheme used in describing the protocol state diagrams which follow. FIG. 2 includes representations of a an initial state 20, termination state 22, delay state 24 and transition indicator 26. Also shown are representations of the AND and OR composition states 28, 30, respectively. As shown, the AND composition 28 of lower level states allows the representation of concurrency within the state machine. Similarly, the OR composition 30 represents the system being in any of the component states.

VC Establishment

Figure 3:
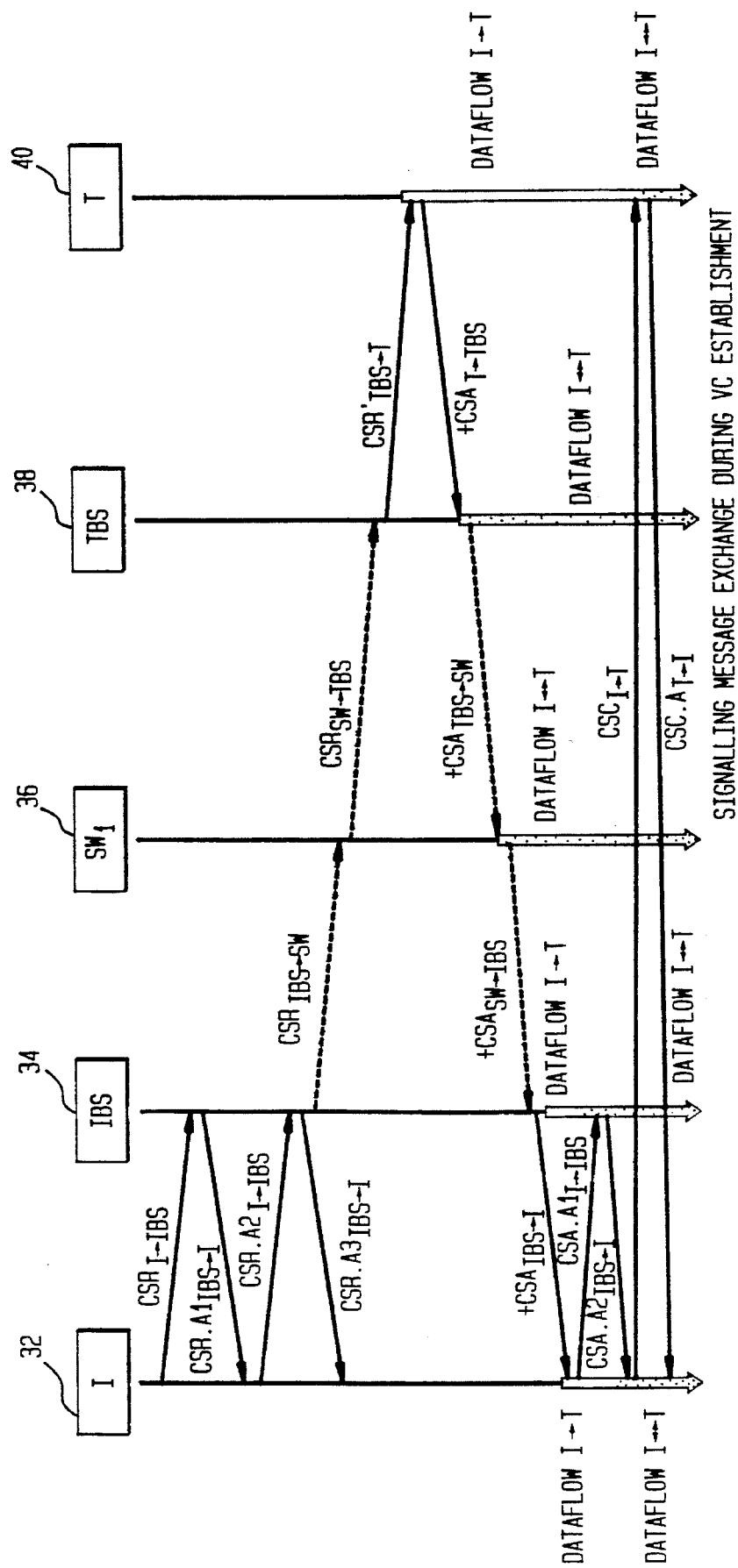
FIG. 3 shows a timeline illustrating one preferred embodiment for signaling message exchanges during VC establishment.
Figure 4:
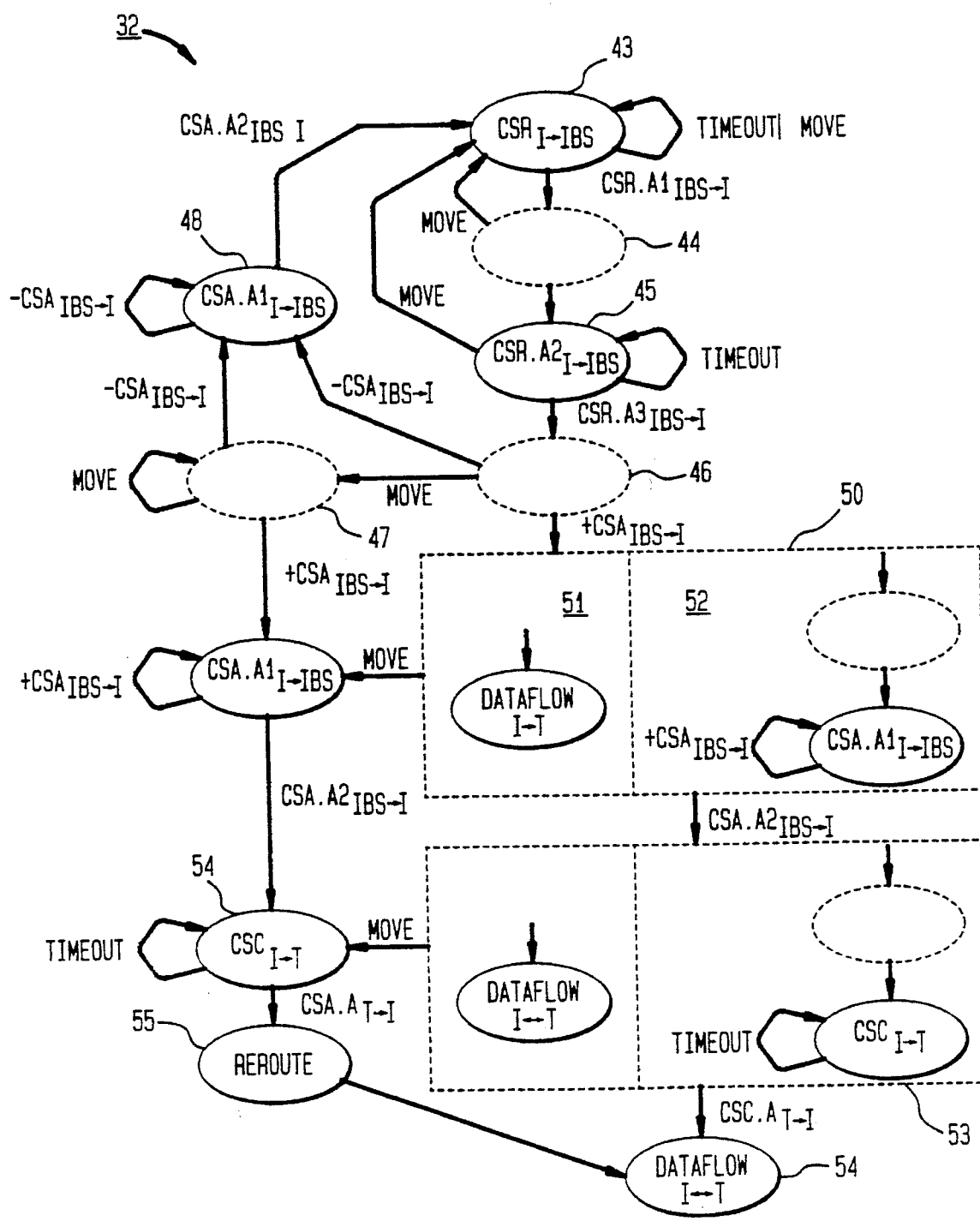
FIG. 4 shows an exemplary state machine diagram for VC establishment at the initiator mobile host.
Figure 6A:
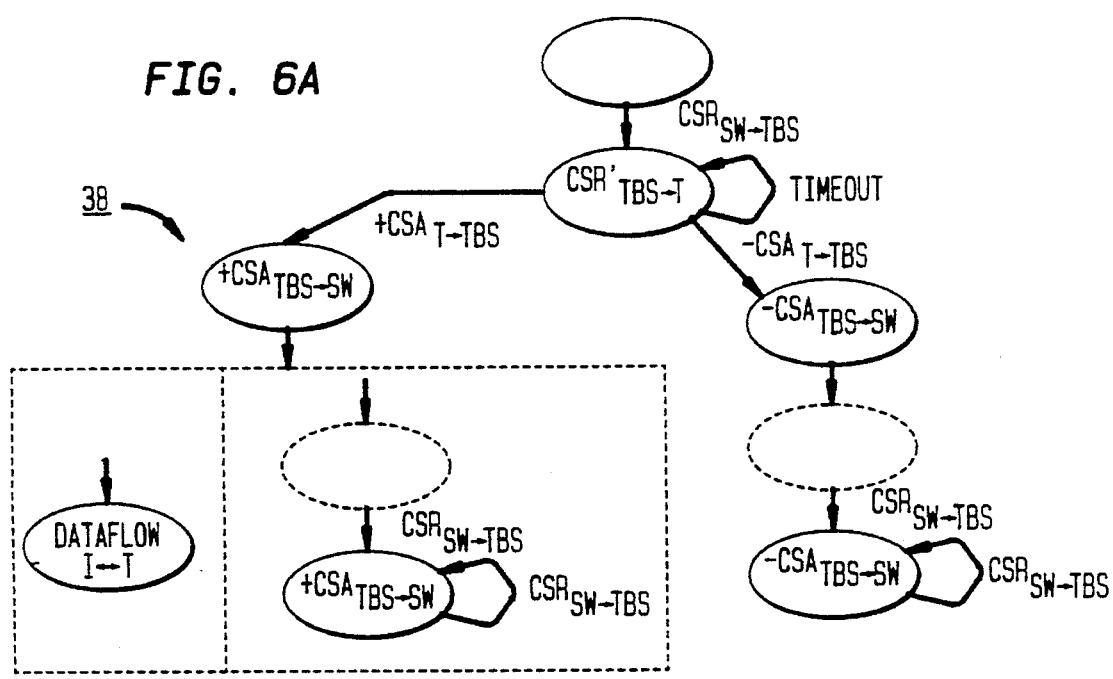
FIGS. 6A and 6B show exemplary state machine diagrams for VC establishment at the target base station and target mobile host, respectively.
Figure 6B:
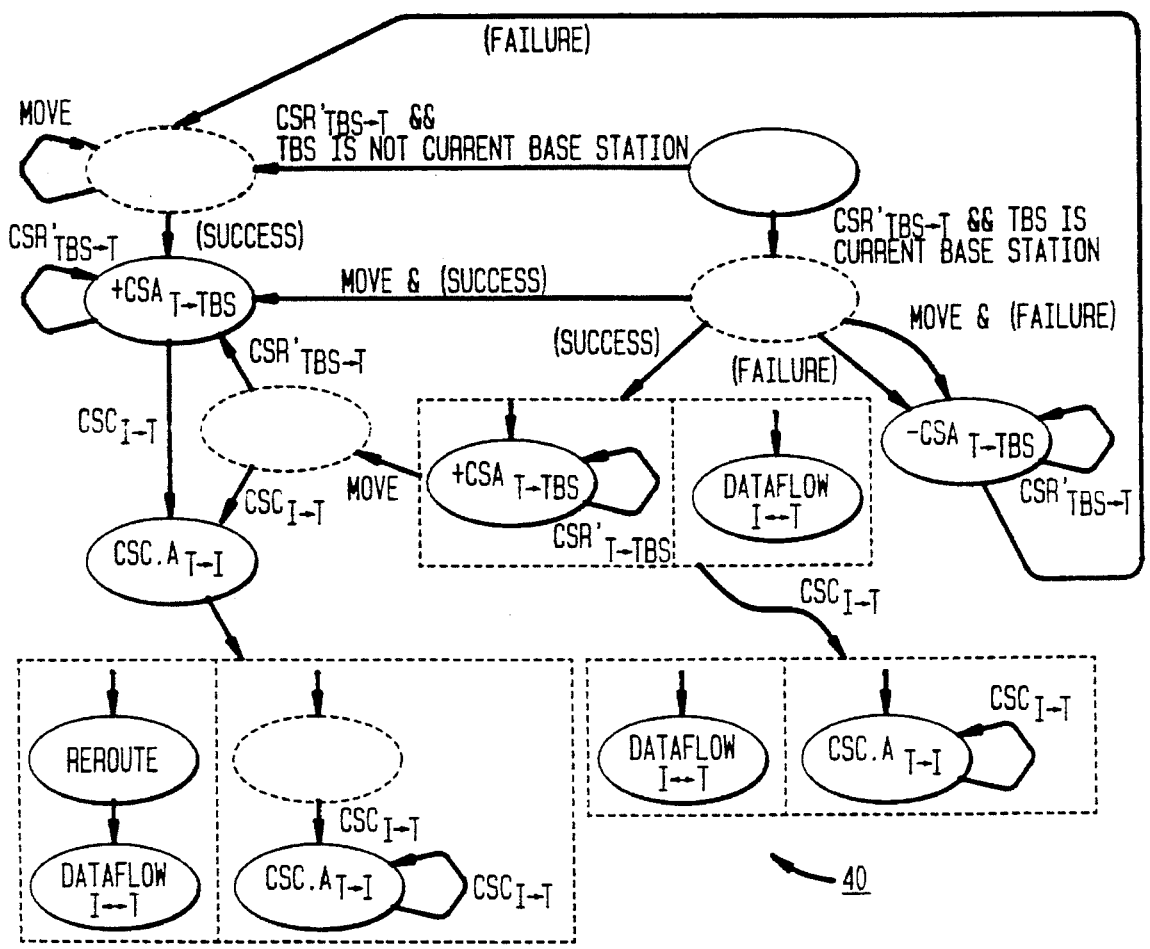

Referring to FIG. 3, in conjunction with FIGS. 4, 5 and 6, the VC establishment process is described using a timeline (FIG. 3) to show the order of message exchanges. FIGS. 4, 5, and 6 show hierarchical state machines illustrating state transitions for each of the entities participating in the establishment procedure. FIG. 3 shows a series of messages exchanged between an initiator mobile host 32, initiator base station 34, switch(es) 36, target base station 38 and target mobile host 40. Thus, the description assumes that both the initiating host 32 and target host 40 are mobiles. In the event either of the end points is a stationary host the protocols are somewhat simplified.

When a mobile host 32 wants to initiate a VC, the (initiator) mobile host 32 sends a Connection Setup Request (CSR) message to the initiator base station (IBS) 34. The base station 34 sends a message acknowledging this request (CSR.A1) and waits to get an acknowledgment of this message. As soon as the initiator base station 34 gets this acknowledgment (CSR.A2) from the initiator mobile host 32, the base station 34 sends a CSR.A3 message to the initiator and forwards the connection set up request into the wired network. This handshake between the mobile host 32 and the base station 34 allows a mobile to abort the VC establishment process (and start it again at a new base station) if the mobile host 32 moves before the CSR message has propagated into the wired network.

If neither the initiator mobile host 32 nor the target mobile host 40 moves during the establishment process and the setup is successful, then the initiator mobile 32 gets a positive Connection Setup Acknowledge (+CSA) message. After a handshake between the initiator mobile host 32 and its base station 34, which allows the base station to enable data transfer in both directions on the VC, the initiator mobile 32 sends the target mobile 40 a Connection Setup Confirm (CSC) message. Following receipt of the CSC message, the target mobile 40 can start data transfer towards the initiator mobile 32. Another function of the CSC message is to inform the target mobile 40 that the VC establishment process has succeeded; this ensures that the target mobile 40 will initiate a reroute for this VC if it moves.

In case any of the switches 36, base stations 34, 38 or target mobile 40 is unable to set up the VC then a −CSA message is sent back to the initiator mobile 32 and the VC setup times. (Not shown in FIG. 3). As would be understood, since signaling messages are able to track a mobile even after it moves, both the initiator mobile 32 and the target mobile 40 can continue to participate in the VC establishment protocol even if they move. In this case, after the entire process is completed a reroute is triggered. The only exception is if the initiator mobile 32 moves before receiving the CSR.A3 message in which case the VC establishment is aborted.

As has been discussed, FIGS. 4–6, describe exemplary state diagrams for each of the entities involved in the VC establishment process. As shown in FIG. 4A, the initiator mobile host 32 generates a CSR message to the initiator base station 34 in a first state 43. The initiator mobile 32 waits to receive the CSR.A1 message at which time three possible events may take place. In a first case, the initiator mobile host may move, or else, the window for receiving the CSR.A1 message may time-out, in either case for which another CSR message would be generated. If the CSR.A1 message is received, the mobile host 32 enters a delay state 44 at which time the mobile may move or generate the CSR.A2 message, as shown in state 45. Once again three possible events may take place; that is, a time-out, at which time another CSR.A2 message would be generated; a move which brings the mobile host back to generation of a CSR message in state 43; or receipt of a CSR.A3 message from the initiator base station 34. If the CSR.A3 message is received, the mobile host 32 enters another delay state 46, wherein a move causes the mobile to enter delay state 47; or a −CSA message indicating the failure of a VC setup is received at which time the mobile generates a CSA.A1 message from state 48; or a +CSA message is received which is part of the best case scenario.

If the +CSA message is received, the mobile enters a first AND state 50, in which two distinct operations operate in parallel. In a first half 51 of the AND state 50, data flow begins from the initiator mobile 32 to the target mobile host 40. In the second half 52 of the AND state the mobile 32 will wait and then generate a CSA.A1 message. At this point, the mobile 32 may move, at which time a CSA.A1 message will also be generated or a second AND state 53 will be entered. Two parallel operations take place in the second AND state 53. A first operation is bi-directional data flow between the initiator and target mobile hosts 32, 40: a second operation is a CSC message generated to the target mobile host 40. At this time, the initiator mobile can receive a CSC message from the target, wherein data flow would continue at state 54. The mobile 32 could also move while in the second AND state 53, wherein a CSC message would be generated at state 54. After receiving a CSC message from the target 40 a reroute would be instituted at state 55. As can be seen, one half of the state machine indicates the states for the initiator mobile 32 if all goes according to plan, while another half takes into consideration mobile moves and VC setup failures. The analysis of the state machines for the initiator base station 34, switch 36, target base station 38 and target mobile host 40 is accomplished in a similar fashion as shown in FIGS. 5A, 5B, 6A, 6B.

VC Rerouting

After a VC is established, data can be flowing in both directions. If a mobile moves during this data transfer phase, however, there has to be a way for the mobile to continue to send and receive data for all the VCs for which the mobile is a terminating point. Four approaches are considered with respect to the present invention to solve this problem. A first approach is to extend all the VCs from an old base station to a new base station—referred to as the extend option. A second is to tear down the existing VCs and reestablish new VCs and a third is to partially modify the path of the existing VCs. Since the third option is a more general case of the second option the second and third options are described together as the rebuild option. A fourth option is to use multicast support to set up multiple paths in the network to all the base stations in cells that a mobile host visits. This is referred to as the multicast option.

In general, the parameters of the network environment and the performance metrics of interest will dictate which or the above approaches should be utilized at any given time. The principal metrics of performance are the efficiency of network bandwidth usage and the service quality seen by individual VCs. The efficiency of network bandwidth usage is affected by the optimality of the paths found from source to destination where the path cost is measured in terms of the number of hops on the path, i.e., wherein the use of non-shortest cost paths through the network reduces efficiency. However, when computing the costs of a path, a distinction has to be made between less expensive local paths and more expensive global paths. It is believed that local paths are less expensive both in terms of the cost of available bandwidth and the delay they introduce, for example, consider the bandwidth cost and delay characteristics of a departmental Ethernet LAN vs. a wide area T-1 multiplexed line. The service quality seen by a VC is determined by the delay, loss and throughput characteristics of the network path over which it is routed. These characteristics are governed by two variables: the transient disruption experienced by a connection when a hand-off occurs and the steady state behavior when a mobile is not moving across cell boundaries. Other important characteristics to be considered are delay jitter, i.e., a variance in delay, and packet loss rate.

Figure 7A:
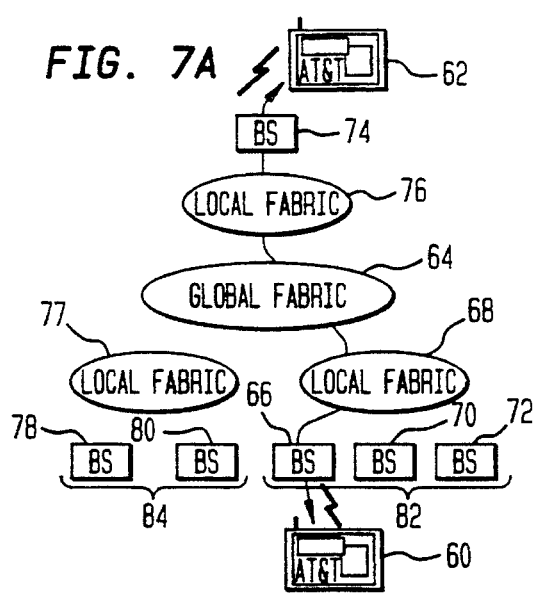
FIGS. 7A–7F show various VC rerouting scenarios used by the present invention.

In the target environment for the present invention, such as that described in FIG. 1, it is likely that a mobile will frequently cross cell boundaries; however, most of the expected movement will be within a local domain. Referring to FIG. 7A, there is shown a first mobile 60 and second mobile 62 communicating through a global switch fabric 64. The first mobile 60 communicates to a first base station 66 which is coupled to a first local switching fabric 68, as are third and fourth base stations 70, 72. The second mobile 62 communicates to a second base station 74 which in turn is coupled to a third local switch fabric 76. The first, third and fourth base stations 66, 70, 72 and the first local switching fabric constitute a first local domain 82, while fifth and sixth base stations 78, 80 coupled to a second local switch fabric 77 constitute a second local domain 84.

Figure 7B:
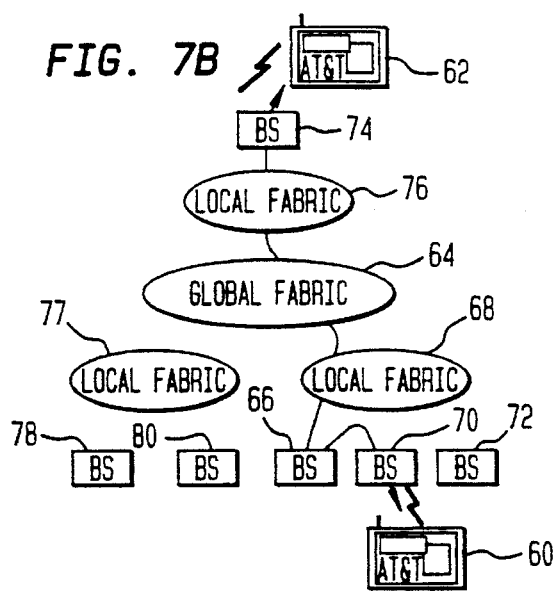

In this scenario, it is appropriate to perform path extensions for two reasons, as long as the mobile 60 is moving in a local domain. First, the increased cost of the network path has only a small effect on overall network efficiency since local paths are assumed to be less expensive. Second, the longer paths are unlikely to significantly affect the steady state delay and loss characteristics seen by the VCs and doing a local extension minimizes the disruption time seen by a user. An exemplary route extension is shown in FIG. 7B, where the first mobile 60 has now moved to a cell associated with the third base station 70. In this case the route of the VC is extended to travel through the third base station 70.

Figure 7C:
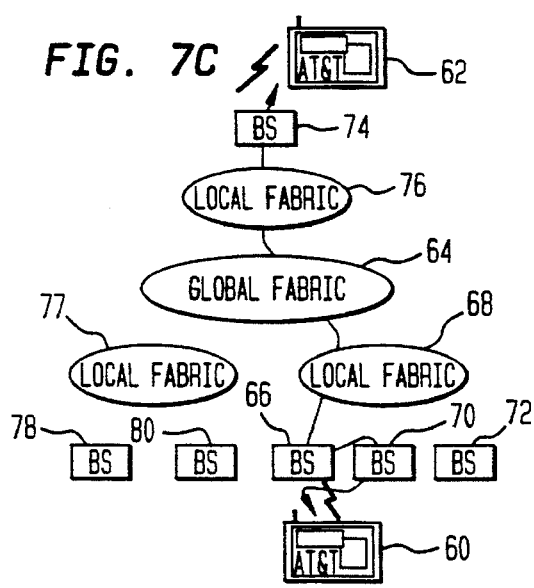
Figure 7D:
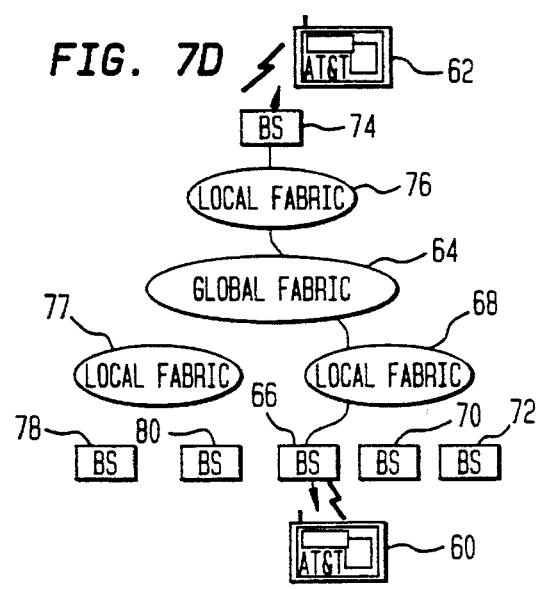

As discussed previously, loops may result in a VC when a mobile travels back and forth between locations one or more times. FIG. 7C illustrates a simple loop which resulted from the extension shown in FIG. 7B. The extension resulted in a loop when the first mobile 60 moved from a cell associated with the third base station 70 back to the first base station 60. Loop removal results in a shorter path, as shown in FIG. 7D. A simple optimization that may be used to improve network efficiency during the extension process is to detect and eliminate loops, i.e. when the same base station appears twice in the path. FIGS. 11 and 12 illustrate this approach.

Figure 7E:
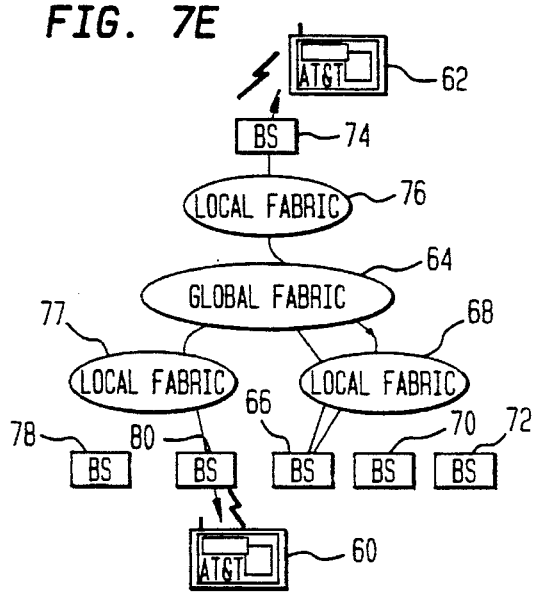
Figure 7F:
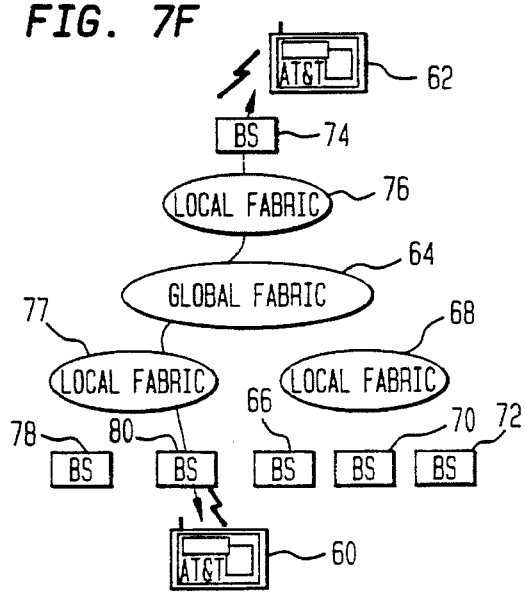

When a domain boundary is crossed, building an extension will cause a more costly network path to form. This may be used as a trigger to rebuild the routing tree. FIG. 7E shows the first mobile moving from the first local domain to associate itself with the fifth base station 80 in the second local domain 84. As will be explained, such an action will trigger a partial rebuild of the virtual circuit (VC) connection towards a more cost effective route. FIG. 7F shows how the VC has been altered to eliminate connections in the first local domain 82.

The above strategy may be customized for individual classes of applications. For interactive applications, such as remote login or image browsing, the main QOS metric is the end to end delay seen by user data units. For continuous media applications, there is a certain minimum bandwidth requirement as well as the need to keep the end to end delay within certain bounds. For bulk data transfer applications, such as image downloading or file transfer, the main QOS metric is the throughput. Hence, for both interactive and real-time applications, using the measured delay to trigger a reroute will result in minimization of service disruption due to hand-offs while keeping the maximum delay bounded. On the other hand, for bulk data transfers, using the measured delay to trigger a reroute will result in network bandwidth being used more efficiently but might not result in an improvement in the throughput. Hence, an alternative trigger for this class of applications may be to request a reroute if the achievable throughput decreases.

The exact manner in which the above strategies will be implemented is partly dependent on the routing algorithm used in switches used in the network and the signaling mechanisms. In a preferred embodiment of the invention, next-hop routing is used to decide the virtual circuit path. It is also assumed that each network switch has an estimate of the cost of the path to every, destination. This information is available explicitly when a distance vector routing algorithm is used and may be computed from a topology view when a link state routing algorithm is used. Each mobile host also maintains a Visit List of the base stations visited since the last aggregate rebuild.

VC Extension

Figure 8:
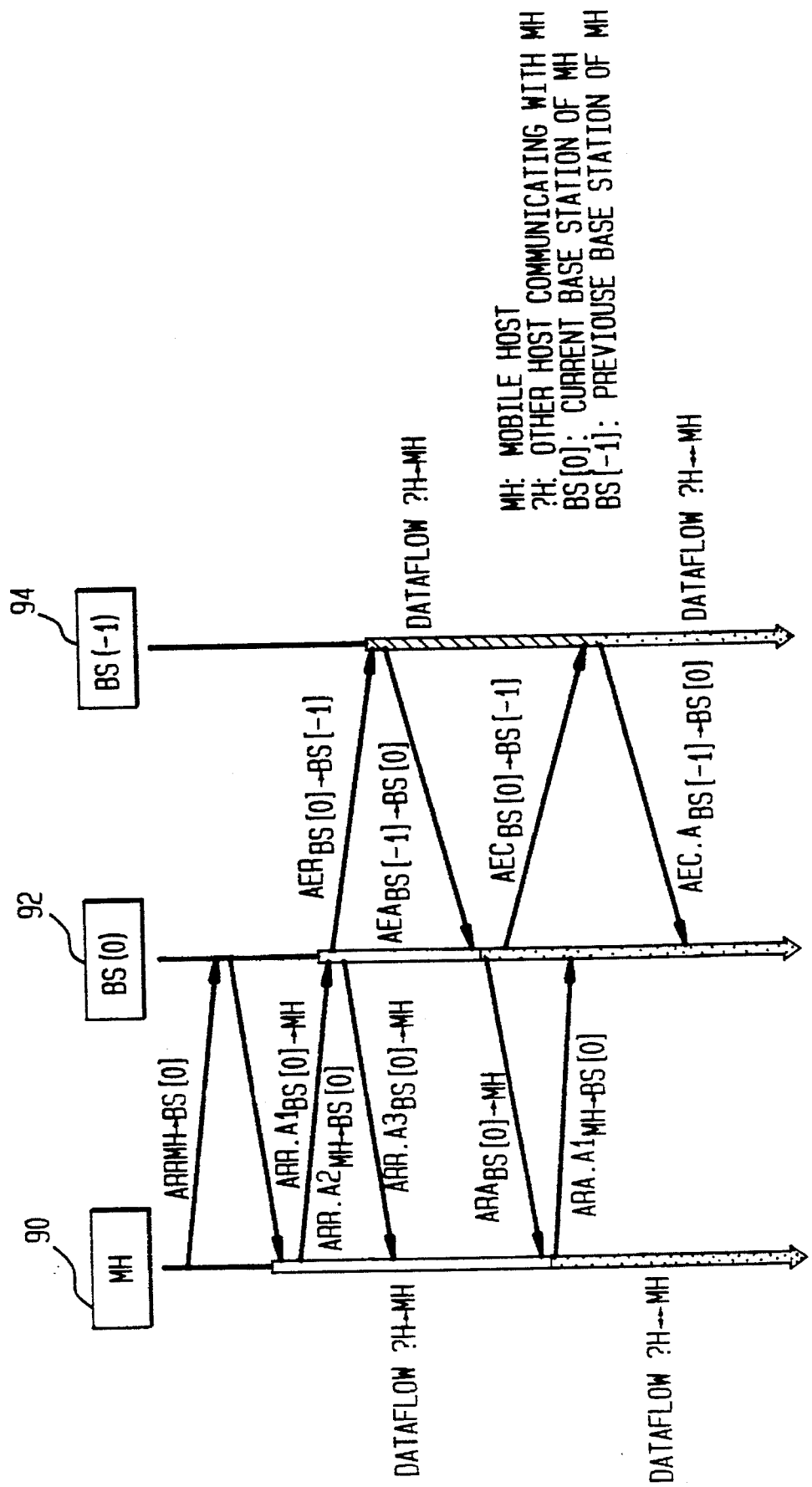
FIG. 8 shows an exemplary timeline diagram for signaling message exchanges for VC extension during rerouting.
Figure 9:
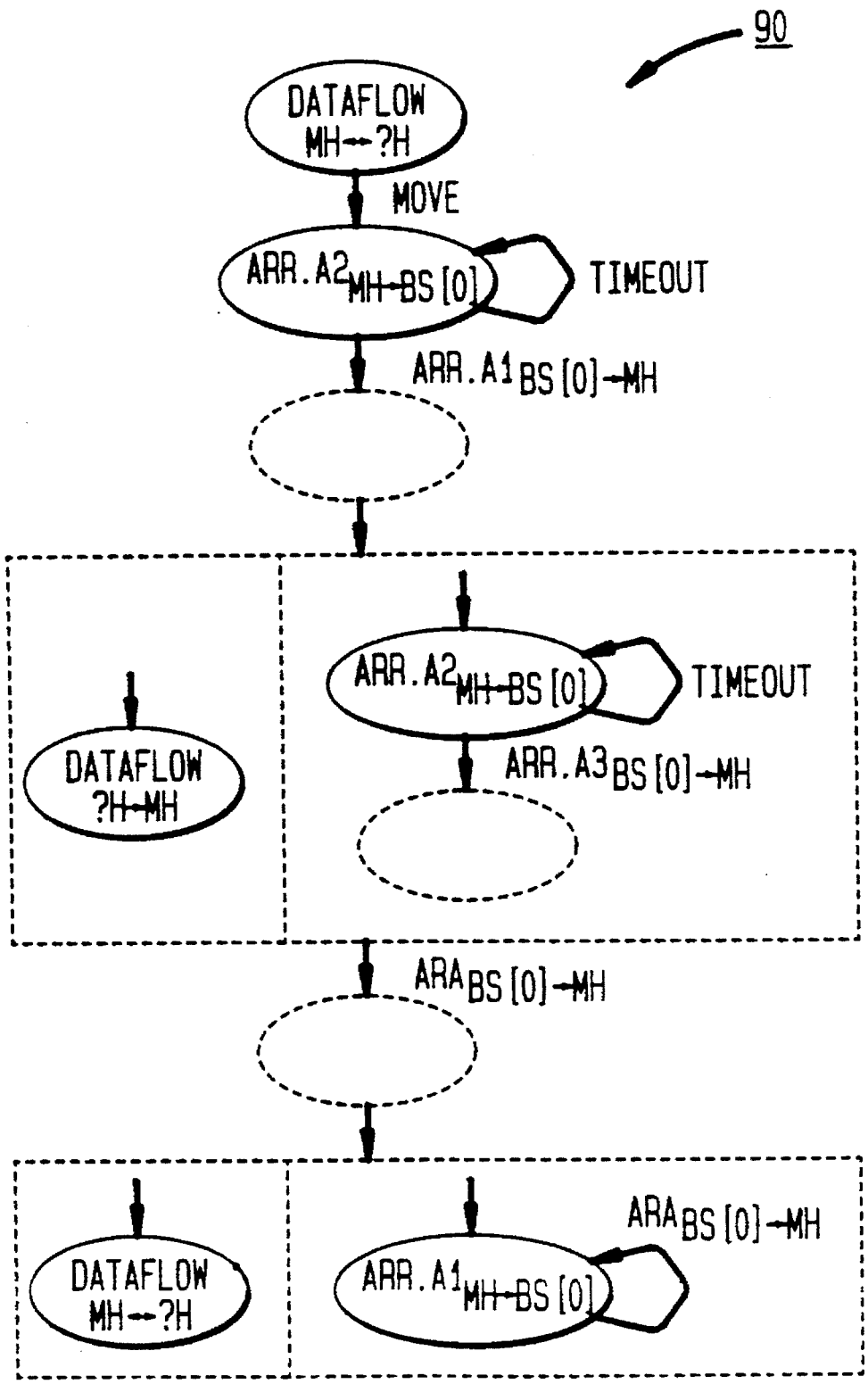
FIG. 9 shows an exemplary state machine for simple VC extension during rerouting at a mobile host.

Referring to FIG. 8 in conjunction with FIGS. 9 and 10 there is shown a timeline representation for a signaling message exchange for VC extension during rerouting. FIGS. 9 and 10 show state diagrams of the VC extension for each of the entities in the timeline. In the description of rerouting, BS[0] refers to the current base station; BS[−1], BS[−2] etc. to previously visited base stations; and BS[1], BS[2] etc. refer to subsequently visited base stations.

After moving into a new cell a mobile host (MH) 90 in FIG. 8 attempts to contact a new base station BS[0] 92. The MH 90 sends an Aggregate Registration Request (ARR) message to the new base station 92 with the id of the previously visited base station, BS[−1] 94, and the VCI (virtual circuit identifier) values for all the incoming and outgoing VCs of the mobile host 90. New base station BS[0] 92 reserves a set of VCIs for these VCs and sends the values back to the MH 90 via message (ARR.A1). There is a handshake between the MH 90 and BS[0] 92 (ARR.A2, ARR.A3) so that both MH and BS[0] know that the VC index exchange has been successful. The handshake is the key step in the registration process which allows the present invention protocol to handle multiple moves. Subsequent to the handshake, BS[0] 92 becomes the last base station that the MH 90 has visited even if the MH 90 moves before BS[0] 92 is able to successfully initiate data transfer. During the process of registration the mobile 90 and the new base station 92 decide for each VC whether an extension or loop removal operation needs to be invoked. To reduce signaling extensions and loop removal, operations are done in an aggregate fashion.

FIG. 8 also shows the sequence of messages during a connection extension operation. After registration BS[0] 92 sends an AER message to BS[−1] 94. Upon receipt of this message BS[−1] 94 will update its routing table entries for the bundle of connections, and disables data forwarding towards MH 90. Subsequently BS[−1] 94 sends an Aggregate Extend Acknowledge (AEA) message to BS[0] 92. Upon receipt of this message BS[0] 92 sends an Aggregate Extend Confirm (AEC) to BS[−1] 94 and an Aggregate Extend Accept (AEA) to the MH 90. Receipt of these messages allows the respective entities to enable bi-directional transfer.

If a mobile host (MH) 90 moves to a new base station, say BS[1], (where BS[1] is the base station visited after BS[0]) before receiving the ARR.A1 message then it registers with BS[1], identifying BS[−1] 94 as the last base station visited with the subsequent procedure being identical to that described above. If the MH 90 moves after receiving the ARR.A1 message, but before receiving the ARA message, MH registers with BS[1], identifying BS[0] as the last base station visited. If, BS[0] 92 gets the AER message from BS[1] after receiving the AEA message from BS[−1] 94, then it sends an AEA to BS[1] and enables dataflow in the MH→?H direction. BS[0] 92 also sends an AEC message to BS[−1] 94. Upon getting an AEC message from BS[1], BS[0] also enables dataflow in the ?H→MH direction. On the other hand, if BS[0] 92 gets the AER message from BS[1] before getting the AEA message from BS[−1] 94, it waits until it receives this AEA message and only then sends an AEA back to BS[1].

Thus, the MH 90 does not start sending data until it gets an ARA which the MH cannot get until the whole path is complete. In the other direction, data may flow from base station to base station in spurts as the AEC messages are received. Data may be lost, however, if the mobile is no longer in the cell of a base station that has not yet received a AER message and has the Dataflow ?H→MH enabled. A more conservative approach, then, is to disable dataflow ?H→MH at BS[0] 92 until the ARA.A1 messages has been received from the MH. This will increase delay slightly but reduce data loss.

Figure 10A:
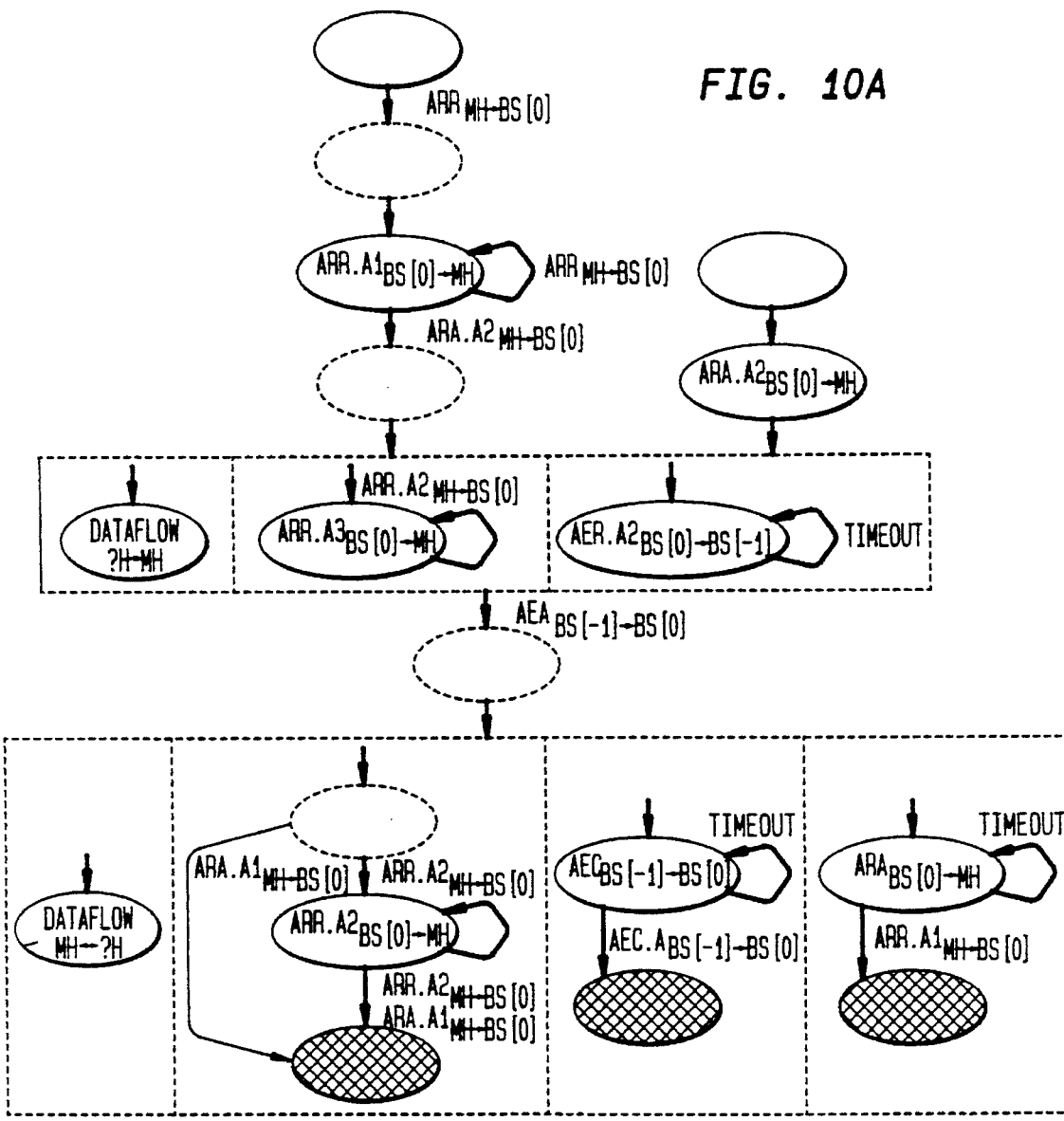
FIGS. 10A and 10B show exemplary state machines for simple VC extension during rerouting at a current and previous base station BS[0], BS[−1], respectively.
Figure 10B:
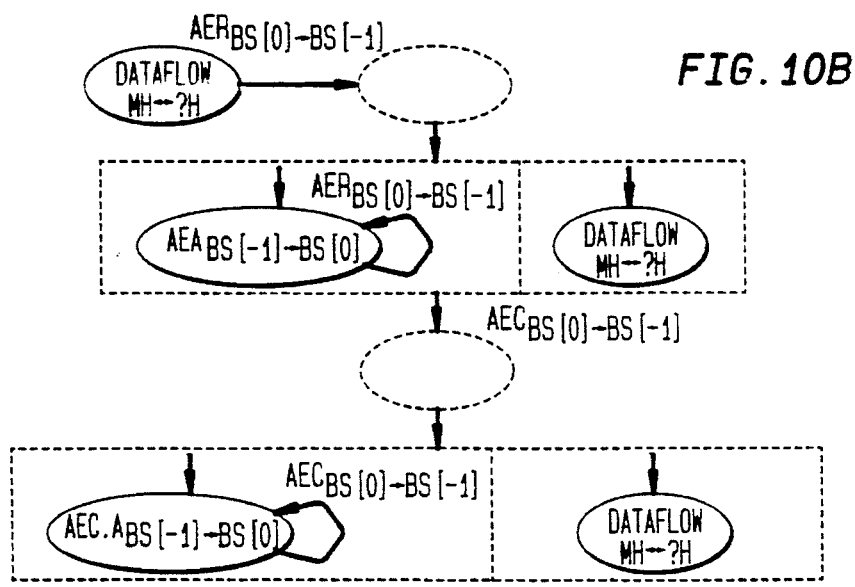

As discussed. FIGS. 9, 10A and 10B show state diagrams for VC extension during rerouting for MH 90, BS[0] 92 and BS[−1] 94. Unlike in the case of VC establishment, the effect of moves in the state diagrams for rerouting are not explicitly indicated. The effect of moves at various stages of rerouting has, however, been explained in some detail above.

Removal of Loops in a VC

A special case of an extension occurs if a mobile visits a base station that the mobile has previously visited since the last rebuild of a virtual circuit (VC). In this case a loop is formed in the path as was shown in FIG. 7C. While a single loop may not affect performance significantly because local paths are considered inexpensive, the formation of multiple loops can tie up resources such as VCIs at base stations and also create congestion. Multiple loops can form very easily in the target environment considered for use with the present invention. For example, consider the situation where a user in his wanderings keeps moving back and forth between two cells that are co-located in a large room.

Referring to FIG. 11, in conjunction with FIG. 12, the sequence of events during a loop removal operation is illustrated, wherein FIG. 12 shows a state machine diagram for base station BS[0] 92 during loop removal. FIG. 11A shows mobile host 90 moving from a previous location associated with base station BS[−1] 94 to a current base station BS[0] 92. Intermediate base stations BS[−2] 96 to BS[−n] 98 are positioned between the previous base station BS[−1] 94 and the current base station BS[0] 92. BS[0] 92, as shown in FIG. 11A, is the same as BS[−(n+1)], thus the extension of the VC has resulted in a loop.

Figure 11A:
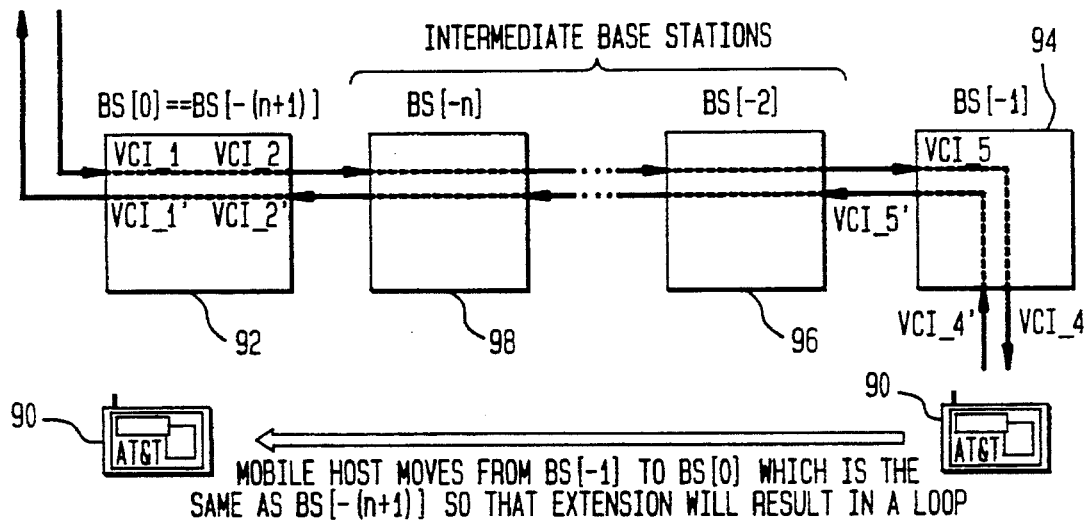
FIGS. 11A–11E illustrate an exemplary loop removal algorithm performed during VC rerouting.
Figure 11B:
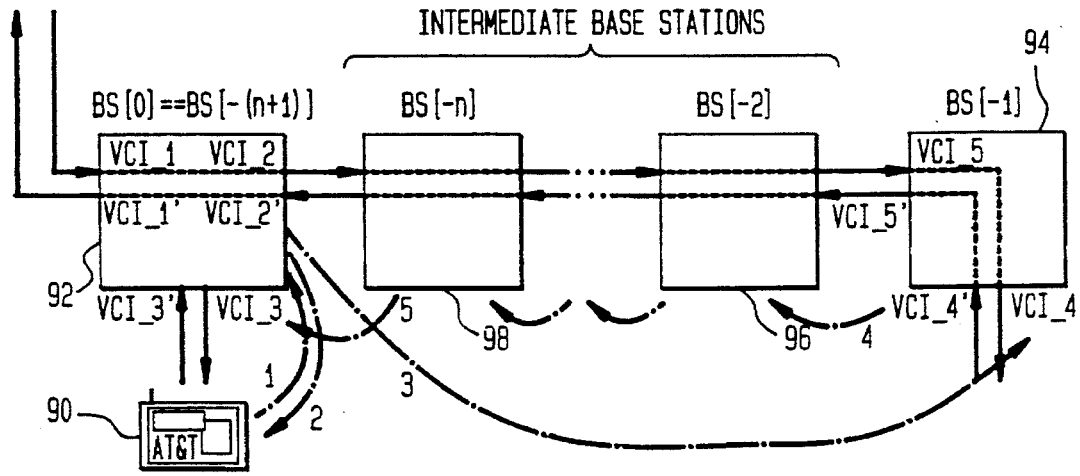
Figure 11C:
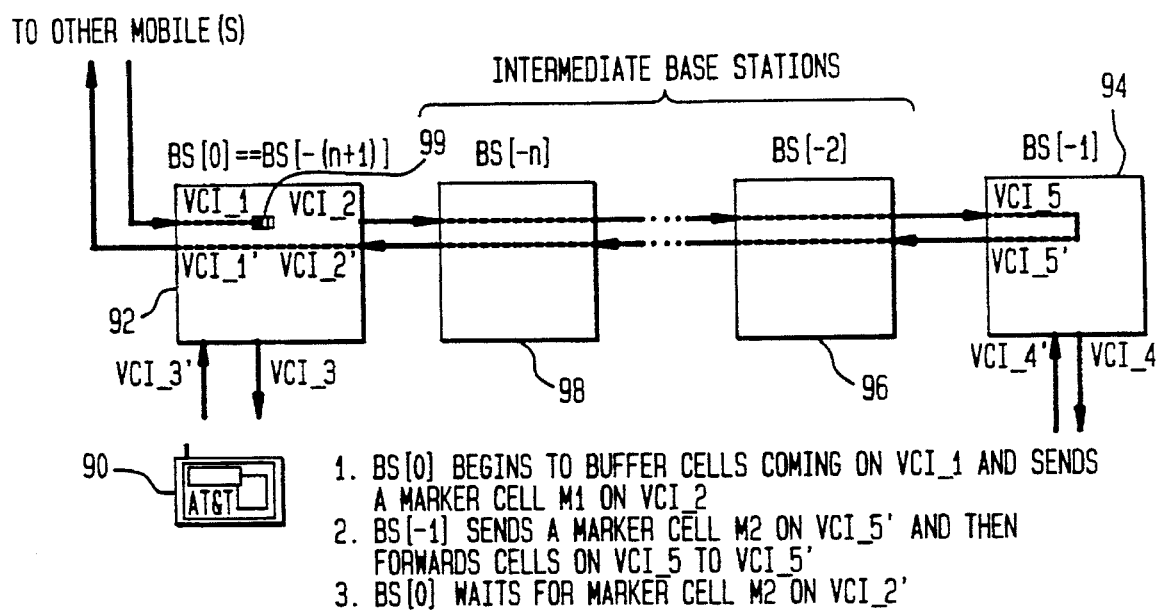
Figure 11D:
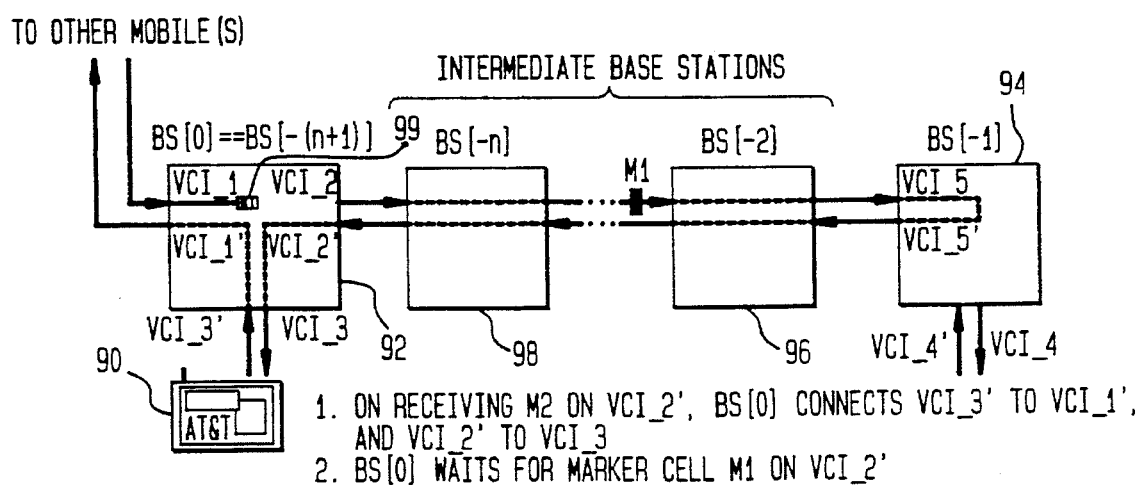
Figure 12:
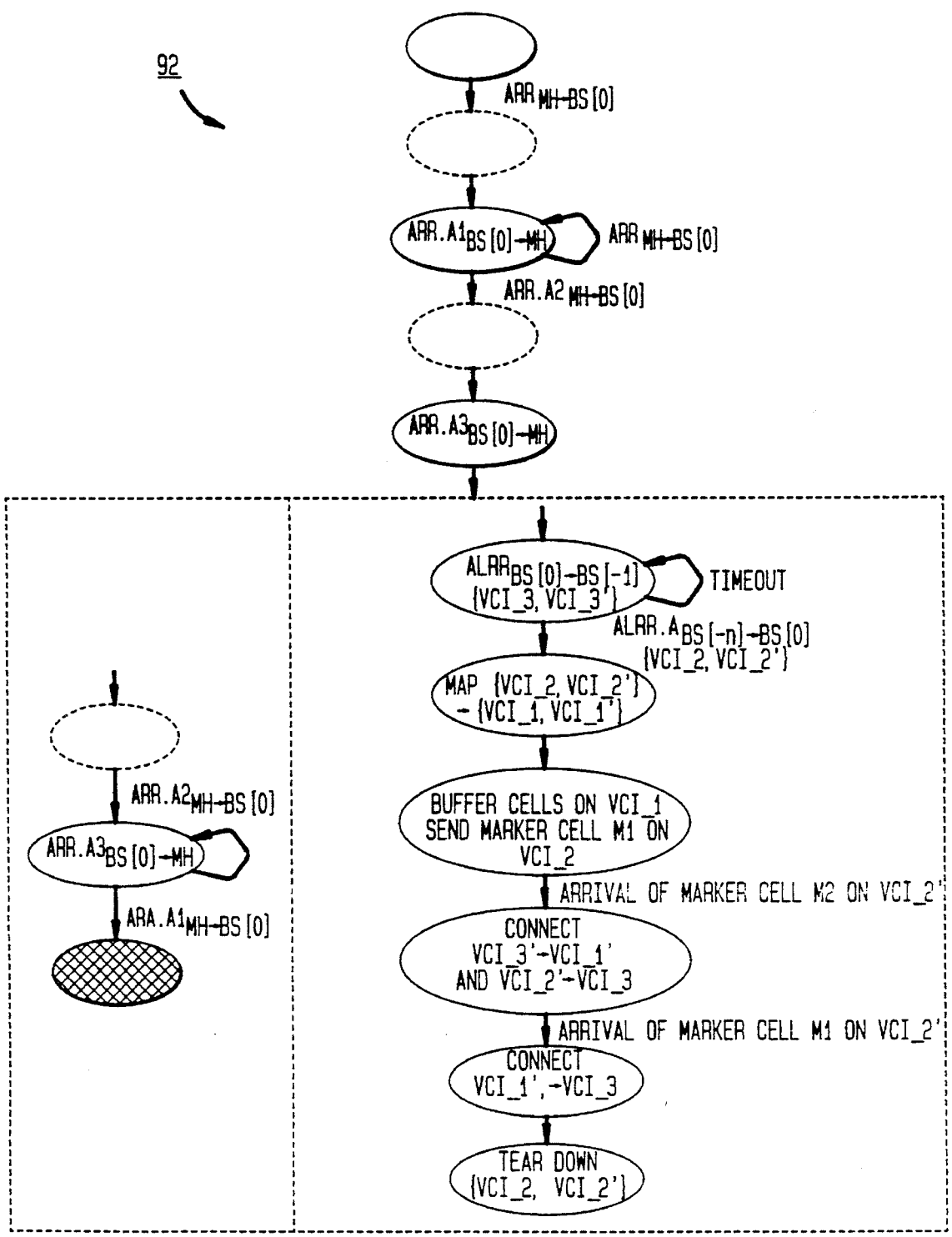
FIG. 12 shows an exemplary state machine diagram for loop removal at a current base station BS[0]

Upon registration by the mobile host 90 at BS[0] 92, as shown in FIG. 11B, BS[0] 92 sends out a special Aggregate Loop Removal Request (ALRR) to BS[−1] 94. Like the AER message, the ALRR message contains a list of VCI values and, in addition, also contains a list of base stations on the loop. The ALRR message is propagated back towards BS[0] 92 along the loop with each base station substituting a VCI value it receives for an input (output) link by the VCI value of the corresponding output (input) link. This enables BS[0] to discover the VCI values used by the mobile host (MH) 90 during its previous visit to BS[0]. FIGS. 11B–11D illustrate these steps in greater detail, wherein mobile host (MH) 90 registers with BS[0] 92 and provides BS[0] with its previous VCI {VCI_4, VCI_4'}. BS[0] 92 then reserves {VCI_3, VCI_3'} and informs the MH 90. In a next step (3) BS[0] 92 sends {VCI_4, VCI_4'} to BS[−1] 94 and using a table look-up BS[−1] 94 maps {VCI_4, VCI_4'} to {VCI_5, VCI_5'} which is then sent to BS[−2] 96 and so forth. Carrying out the process, since BS[0]=BS[−(n+1)], eventually BS[0] 92 is able to discover the VCI values used by the mobile host 90 during its previous visit to BS[0] 92, i.e., {VCI_2, VCI_2'} and {VCI_1, VCI_1'}.

With the VCI values known, BS[0] 92 begins to buffer incoming cells on VCI_I in buffer 99 and then sends a marker cell M1 on VCI_2 as shown in FIG. 11C. BS[−1] 94 next sends a marker cell M2 toward BS[0]92 on VCI_5' and then begins forwarding cells received on VCI_5 to VCI_5', as shown. BS[0] then waits for marker cell M2 on VCI_2'. Upon receiving marker M2 on VCI_2', as shown in FIG. 11D, BS[0] 92 connects VCI-3' to VCI_1' and VCI_2' to VCI_3. BS[0] then waits for marker M1 to arrive on VCI_2'.

Figure 11E:
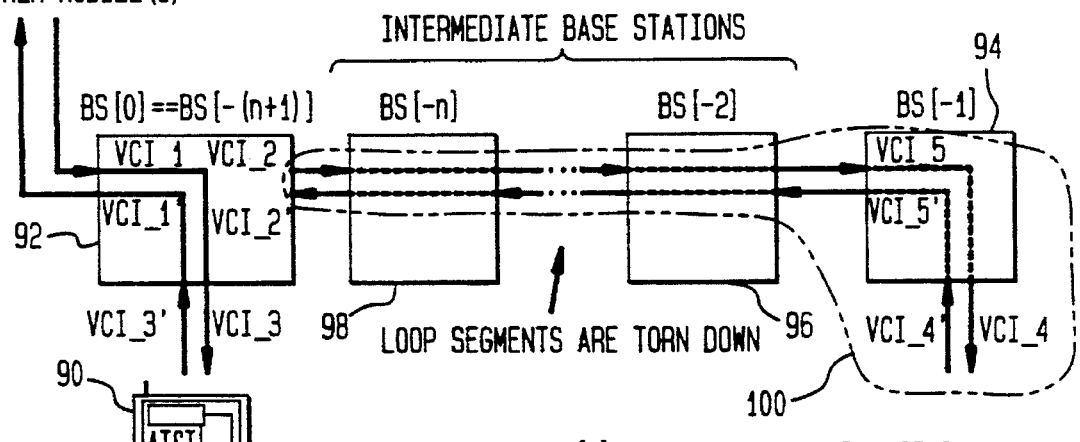

Upon receiving marker M1, as shown in FIG. 11E, BS[0] 92 connects VCI_1 to VCI_3 and initiates a teardown of {VCI_2, VCI_2'}. Thus, BS[0] 92 cuts the loop 100 running through BS[−1] 94 after making sure that all the data in the loop 100 has been flushed. The loop removal algorithm just described ensures that loops will be removed without any loss of data, e.g., by buffering data and delaying teardown until appropriate markers are received. It will be understood, however, that for certain applications where there is concern over delays caused by rerouting, e.g. audio, that a certain amount of data loss may be considered acceptable, as long as delay is minimized. Accordingly, in such cases, loops may be eliminated immediately alter discovering the previous VCI values of the mobile, or else, a somewhat less complicated algorithm may be used than that previously described. It is also pointed out that loop removal does not necessarily apply to all connections terminating at a mobile. Connections that have been created after a mobile visited the current base station for the first time, only need to be extended.

As considered previously, successive VC extension events can occur as a mobile moved from BS[−1] 94 to BS[0] 92 to BS[1] 96. However, the availability of the loop removal option allows for much more involved scenarios as the mobile host moves among base stations. For instance, a base station that has been previously visited by a mobile host can receive request messages for VC extension (AER) and for VC loop removal (ALRR). A request message may be received even when the signaling associated with the previous request message(s) is not finished. It must be noted, however, that the order in which the AER and ALRR messages are received by a specific base station must alternate.

A simple way of handling a receipt of multiple AER and ALRR messages is to serialize their processing by holding the acknowledgment (AEA and forwarded ALRR) of a new request message until the previous request message is completely processed. This approach, however, may lead to inefficiency in the form of unnecessary latencies in data forwarding. This inefficiency can be alleviated by a more complex approach where the multiple state machines corresponding to various requests are allowed to operate concurrently subject to barrier synchronization conditions, as would be understood by a person skilled in the art. That is, when all the state machines finish their task, they are then synchronized together through an exchange of messages.

Partial Rebuild of a VC

Figure 13A:
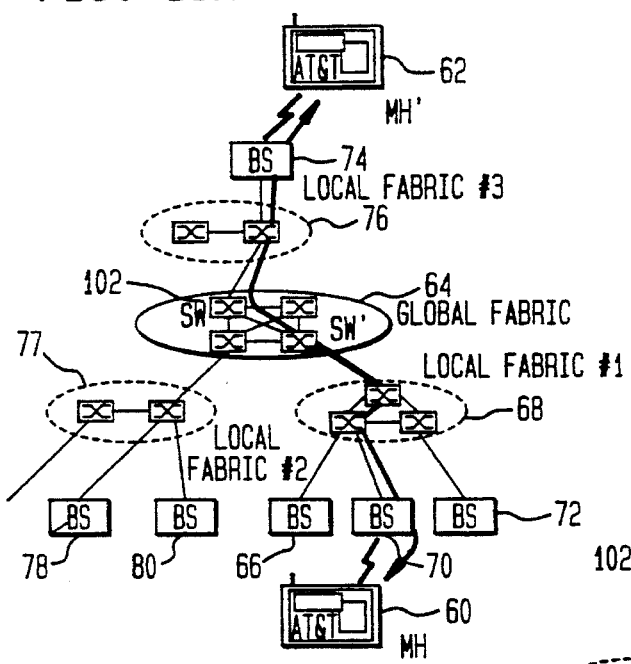
FIGS. 13A–13D illustrate steps taken during a partial rebuild of a virtual circuit (VC)

Referring to FIG. 13A, there is shown a representation of a first mobile host (MH) 60 and a second mobile host (MH')

Figure 13B:
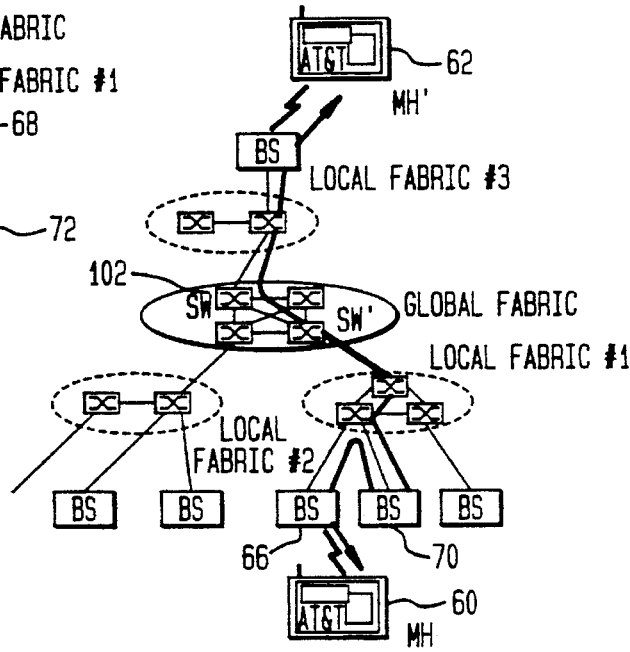
Figure 13C:
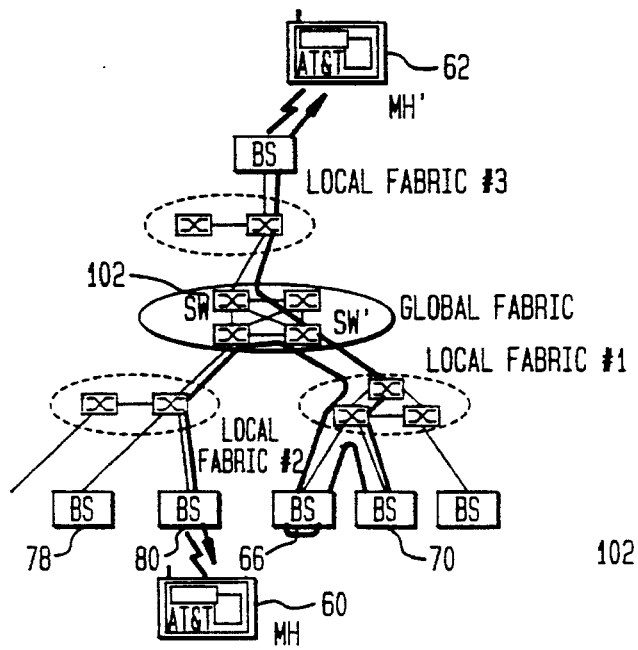

62 communicating to each other through various local switch fabrics 68,76,77 and global switch fabrics 64. The situation is analogous to that presented in FIG. 7A, wherein like elements are referenced using like numbers. FIG. 13A shows the first mobile host 60 associated with an initial base station 70. FIG. 13B shows a hand-off of the mobile host 60 to another base station 66 within the same local domain of the first local switch fabric 68 in which the route is extended, as in FIG. 7B. During the course of its movements, the mobile host 60 may also cross into a new local domain, for example, the second local switch fabric 77 as shown in FIG. 13C, which may result in the formation of a more expensive network path. The problem of an expensive network path traveling through various local domains may be resolved by computing a new route from source to destination for each connection terminating at the mobile. A more efficient option is to execute a rebuild operation in which a part of the routing tree affected by the move is rebuilt. This is a more efficient and less expensive option because fewer switches have to be involved in the operation thereby speeding up the hand-off time.

The main step in implementing a rebuild operation is to find a switch in the routing tree from which to build a new path to the current base station of the mobile. Various criteria have been proposed for picking such a common ancestor switch. The present invention utilizes a unique selection scheme in that the common ancestor switch is picked as a switch from which the path cost, measured in terms of delay, to the new base station is approximately the same cost as that to the first base station on the Visit List of the mobile. This is consistent with a philosophy of trying to minimize the effect of hand-offs on the variation in performance seen by applications. Implementing such a scheme, implies that each network switch has an estimate of the cost of the path to every destination and is available with both link-state and distance-vector algorithms. It is assumed that a rebuild operation is triggered if some measure of performance such as end to end delay is affected.

Figure 13D:
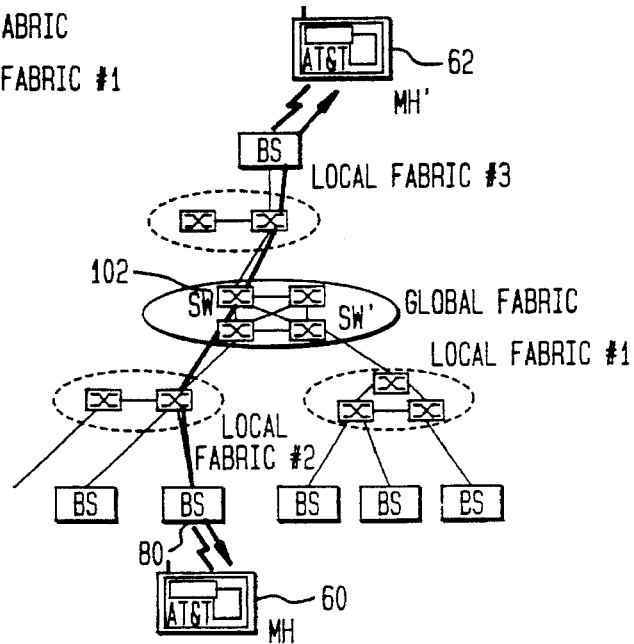

The rebuild procedure works as shown in FIGS. 13C and 13D. When a mobile 60 wishes to trigger a rebuild it sends an Aggregate Rebuild Request (ARR) to its new base station 80 providing the identity of the first base station 70 on its Visit List. The new base station 80 forwards this message to the first base station from which the search for a common ancestor, meeting the criterion outlined above, is initiated, wherein the rebuild message is sent along the path to the second mobile host 62. In the example of FIG. 13D, switch (SW) 102 is the first switch where the estimated delay to the current base station is the same as the estimated delay to the initial base station.

Figure 14:
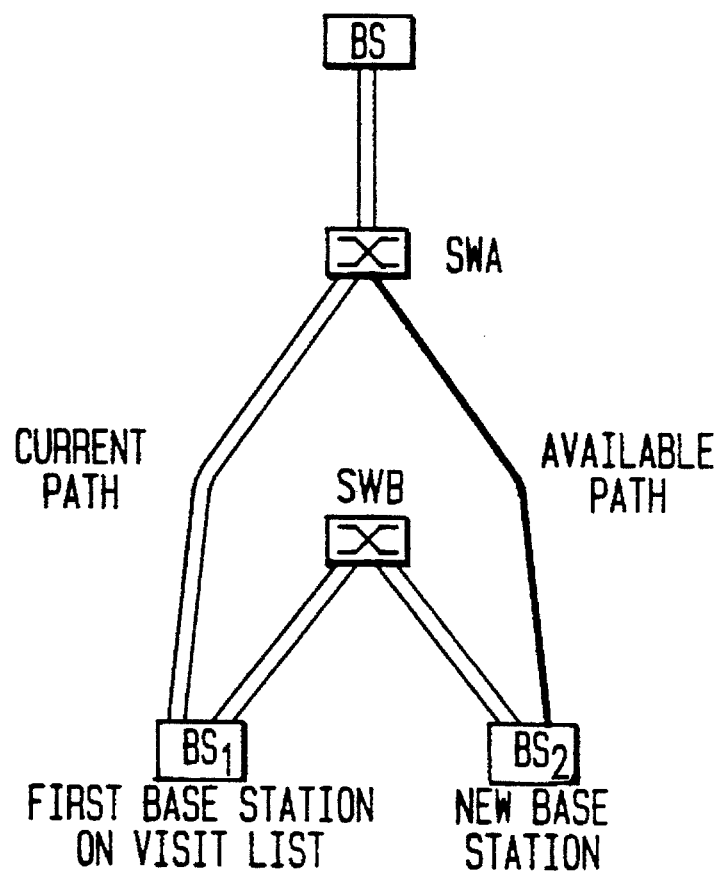
FIG. 14 illustrates an exemplary search for an equi-delay common ancestor during VC rebuild.

FIG. 14 illustrates that if the search for equi-delay common ancestor is begun from the new base station BS2 rather than from BS1, the first base station on the Visit List, then switch SWB is wrongly identified as the common ancestor. Thus, it is important that that the common ancestor search be begun at the first base station BS1 in order to ensure the most efficient search results.

It is possible that the two communicating mobile hosts may simultaneously issue VC rebuild requests. One cannot let the search for common ancestors corresponding to the two rebuild requests to proceed independently because this may lead to an inconsistent routing tree with loops or disjoint components. This complication is handled by marking the state of VC as being rebuilt when a rebuild message is received by a switch, and by not allowing rebuild messages from the other end of the VC to propagate across such switches.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method of call establishment in a communications network, wherein mobile user devices are wirelessly coupled to said network via base station units corresponding to a predetermined cell boundary in said network, said network including a virtual circuit (VC) routing mechanism adapted to establish virtual circuit connections for transmission of data in said network, said method comprising the steps of:

establishing a VC connection path between a mobile device and another endpoint in said network, wherein said step of establishing said VC connection path includes the steps of:

sending a connection setup request from said mobile device to an associated base station to thereby initiate a communication to said endpoint; and performing a handshake sequence between said mobile device and said associated base station, wherein said connection setup request is transmitted further in said network after completion of said handshake sequence, and wherein the VC establishment process is aborted if said mobile device moves out of the cell boundary of said associated base station prior to completion of said handshake sequence; and extending said VC path subsequent to said mobile device moving from a first cell boundary associated with a first base station to within a second cell boundary associated with a second base station, said first and second base station being coupled to a common local switching fabric.

2. The method of claim 1, wherein said step of establishing further includes the steps of:

receiving a positive connection setup acknowledgment at said mobile device if said setup of said VC path is successful; and sending a connection setup confirmation from said mobile device to said endpoint, wherein dataflow towards said mobile device may begin after receipt thereof; and receiving a negative connection setup acknowledgment at said mobile device if said setup of said VC path fails.

3. A method of call establishment in a communications network, wherein mobile user devices are wirelessly coupled to said network via base station units corresponding to a predetermined cell boundary in said network, said network including a virtual circuit (VC) routing mechanism adapted to establish virtual circuit connections for transmission of data in said network, said method comprising the steps of:

establishing a VC connection path between a mobile device and another endpoint in said network; and extending said VC path subsequent to said mobile device moving from a first cell boundary associated with a first base station to within a second cell boundary associated with a second base station, said first and second base station being coupled to a common local switching fabric, wherein said step of extending said VC path includes the steps of:

sending a registration request message from said mobile device to said second base station, said registration request message including an id of a previously visited base station and VCI values for all incoming and outgoing VCs of said mobile device; and performing a handshake between said mobile device and said second base station indicating successful exchange of said VCI values, wherein said second base station becomes the last base station visited after completion of said handshake.

4. The method of claim 3, wherein said step of extending further includes the steps of:

sending an extension request from said second base station to said first base station, wherein said first base station updates its routing tables, said first base station being the previous base station visited;

transmitting an extension acknowledge message from said second base station to said first base station to thereby acknowledge receipt of said extension request; and communicating an extension confirmation message from said second base station to said first base station and an extension acceptance message to said mobile device, wherein receipt of said extension confirmation message and said extension acceptance message enables bi-directional data transfer between said mobile device and second base station.

5. A method of call establishment in a communications network, wherein mobile user devices are wirelessly coupled to said network via base station units corresponding to a predetermined cell boundary in said network, said network including a virtual circuit (VC) routing mechanism adapted to establish virtual circuit connections for transmission of data in said network, said method comprising the steps of:

establishing a VC connection path between a mobile device and another endpoint in said network;

extending said VC path subsequent to said mobile device moving from a first cell boundary associated with a first base station to within a second cell boundary associated with a second base station, said first and second base station being coupled to a common local switching fabric; wherein multiple extensions in said VC path caused by movements of said mobile device between identical base stations in said network generate loops in said VC path of said mobile device, and eliminating said loops in said VC path of said mobile device by determining the identity of repeated base stations occurring in said path.

6. The method of claim 5, said step of eliminating loops includes the steps of:

sending a loop removal request from a current base station to the previously visited base station, wherein said loop removal request includes a list of VCI values for said mobile device and a list of base stations included in said loop;

propagating said loop removal request along said loop back towards said current base station, wherein each base station receiving said loop removal request substitutes a VCI value received for an input link by a VCI value of a corresponding output link, and substituting a VCI value received for an output link by a VCI value of a corresponding input link, thereby enabling said current base station to discover VCI values used by said mobile device during a previous visit to said current base station; and removing said loop running through said previously visited base station.

7. The method of claim 6, wherein said steps of extending said VC path and eliminating said loops is performed in an aggregate fashion.

8. The method of claim 7, wherein receipt of multiple extension requests and loop removal requests are serialized in processing by holding acknowledgment of a new request message until a previous message is completely processed.

9. The method of claim 7, wherein receipt of multiple extension requests and loop removal requests are processed concurrently subject to barrier synchronization conditions.

10. The method of claim 6, wherein said current base station and said previously visited base station generate data flow markers during loop removal, wherein incoming data to said mobile device is buffered and removal of said loop is delayed until said data flow markers are received at said current base station, thereby ensuring against any data loss.

11. A method of call establishment in a communications network, wherein mobile user devices are wirelessly coupled to said network via base station units corresponding to a predetermined cell boundary in said network, said network including a virtual circuit (VC) routing mechanism adapted to establish virtual circuit connections for transmission of data in said network, said method comprising the steps of:

establishing a VC connection path between a mobile device and another endpoint in said network;

extending said VC path subsequent to said mobile device moving from a first cell boundary associated with a first base station to within a second cell boundary associated with a second base station, said first and second base station being coupled to a common local switching fabric;

monitoring performance characteristics of said VC path between said mobile device and said endpoint; and partially rebuilding said VC path based on reaching a predetermined threshold in said performance characteristics.

12. The method of claim 11, wherein said performance characteristics include measured delay, throughput, delay jitter and packet loss rate.

13. A method of call establishment in a communications network, wherein mobile user devices are wirelessly coupled to said network via base station units corresponding to a predetermined cell boundary in said network, said network including a virtual circuit (VC) routing mechanism adapted to establish virtual circuit connections for transmission of data in said network, said method comprising the steps of:

establishing a VC connection path between a mobile device and another endpoint in said network; and extending said VC path subsequent to said mobile device moving from a first cell boundary associated with a first base station to within a second cell boundary associated with a second base station, said first and second base station being coupled to a common local switching fabric; and wherein said VC path is partially rebuilt from a common ancestor switch in said path upon said mobile device registering with a base station outside of said local switch fabric, wherein said common ancestor switch is selected as a switch from which the path cost, measured in terms of delay, to the new base station is approximately the same cost as that to a first base station on a visit list of said mobile device.

14. A method of rerouting calls in a mobile computing network, wherein mobile hosts are wirelessly coupled to said network via base stations, said base stations being coupled to switching fabrics in said network, wherein said network includes a virtual circuit (VC) routing mechanism adapted to establish virtual circuit connections for transmission of data in said network, said method comprising the steps of:

establishing a VC connection path between a mobile device and another endpoint in said network; and extending said VC path subsequent to said mobile device moving from a previous base station to a current base station;

monitoring performance characteristics of a specific communications application transmitted over said VC; and partially rebuilding said VC path when said performance characteristics as seen by said mobile device degrade below a predetermined level.

15. The method of claim 14, wherein said performance characteristics include measured delay, throughput, delay jitter and packet loss rate, wherein a predetermined value of one or more of said performance characteristics is used to trigger a rebuild in for both interactive and real-time applications and predetermined measures of throughput are used to trigger a rebuild for bulk data transfers.

16. The method of claim 14, wherein said performance characteristics include measured delay, throughput, delay jitter and packet loss rate, and wherein said VC path is partially rebuilt from a common ancestor switch in said path upon said mobile device registering with a base station outside of said local switch fabric, wherein said common ancestor switch is selected as a switch from which the path cost, measured in terms of one or more of said performance characteristics, to the new base station is approximately the same cost as that to a first base station on a visit list of said mobile device.

17. The method of claim 14, wherein multiple extensions in said VC path caused by movements of said mobile host between identical base stations in said network generate loops in said VC path of said mobile host, said method further including the step of:

eliminating said loops in the VC path of said mobile host by determining the identity of repeated base stations occurring in said path.

18. The method of claim 17, wherein said step of eliminating loops includes the steps of:

sending a loop removal request from a current base station to the previously visited base station, wherein said loop removal request includes a list of VCI values for said mobile device and a list of base stations included in said loop;

propagating said loop removal request along said loop back towards said current bases station, wherein each base station receiving said loop removal request substitutes a VCI value received for an input link by a VCI value of a corresponding output link, and substituting a VCI value received for an output link by a VCI value of a corresponding input link, thereby enabling said current base station to discover VCI values used by said mobile device during a previous visit to said current base station; and removing said loop running through said previously visited base station.

19. The method of claim 14, wherein said step of extending said VC path includes the steps of:

sending a registration request message from said mobile host to said current base station, said registration request message including an id of a previously visited base station and VCI values for all incoming and outgoing VCs of said mobile device; and performing a handshake between said mobile host and said current base station indicating successful exchange of said VCI values, wherein said current base station becomes the last base station visited after completion of said handshake.

20. The method of claim 19, wherein said step of extending further includes the steps of:

sending an extension request from said current base station to said previous base station, wherein said previous base station updates its routing tables;

transmitting an extension acknowledge message from said current base station to said first base station to thereby acknowledge receipt of said extension request; and communicating an extension confirmation message from said current base station to said previous base station and an extension acceptance message to said mobile host, wherein receipt of said extension confirmation message and said extension acceptance message enables bi-directional data transfer between said mobile host and said current base station.

21. The method of claim 14, wherein said endpoint is also a mobile host.

22. A system for rerouting calls in a mobile computing network, wherein mobile hosts are wirelessly coupled to said network via base stations, said base stations being coupled to switching fabrics in said network, wherein said network includes a virtual circuit (VC) routing mechanism adapted to establish virtual circuit connections for transmission of data in said network, said system comprising:

at least one mobile host device for establishing a VC connection path between another endpoint in said network via at least one base station and said switching fabric, said mobile host device adapted to monitor performance characteristics of a specific communications application transmitted over said VC; and at least one base station operable for extending said VC path subsequent to said mobile device moving from a previous base station to a current base station said at least one mobile host device and said at least one base station adapted to partially rebuild said VC path when said performance characteristics as seen by said mobile host device degrade below a predetermined level.

23. The system of claim 22, wherein said performance characteristics include measured delay, throughput, delay jitter and packet loss rate, and wherein said VC path is partially rebuilt from a common ancestor switch in said path upon said mobile device registering with a base station outside of said local switch fabric, further including means for selecting said common ancestor switch, wherein said common ancestor switch is selected as a switch from which the path cost, measured in terms of one or more of said performance characteristics, to the new base station is approximately the same cost as that to a first base station on a visit list of said mobile device.

24. The system of claim 22, wherein multiple extensions in said VC path caused by movements of said mobile host device between different base stations in said network generate loops in said VC path of said mobile host device, said system further including:

said mobile host device and base stations including means for eliminating said loops in the VC path of said mobile host device by determining the identity of repeated base stations occurring in said path.

* * * * *